US007079485B1

(12) United States Patent  
Lau et al.

(10) Patent No.: US 7,079,485 B1
(45) Date of Patent: Jul. 18, 2006

(54) MULTISERVICE SWITCHING SYSTEM WITH DISTRIBUTED SWITCH FABRIC

(75) Inventors: Onchuen (Daryn) Lau, Saratoga, CA (US); Chris D. Bergen, Cupertino, CA (US); Robert J. Divivier, San Jose, CA (US); Gene K. Chui, Campbell, CA (US); Christopher I. W. Norrie, San Jose, CA (US); Matthew D. Ornes, Madison, WI (US); King-Shing (Frank) Chui, Sunnyvale, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 1028 days.

(21) Appl. No.: 09/847,711

(22) Filed: May 1, 2001

(51) Int. Cl.
*H04L 12/56* (2006.01)
*H04J 14/08* (2006.01)

(52) U.S. Cl. .................. 370/229; 370/390; 370/395.4; 370/417; 370/432; 370/465; 370/469; 370/506; 398/54; 398/98

(58) Field of Classification Search ................ 370/230, 370/231, 235, 389, 390, 395.1, 395.4, 395.6, 370/412, 413, 414, 417, 418, 432, 465, 469, 370/229, 506; 398/54, 98
See application file for complete search history.

(56) References Cited

U.S. PATENT DOCUMENTS

| 6,101,187 | A  | * | 8/2000  | Cukier et al. ............... 370/396 |
| 6,108,334 | A  | * | 8/2000  | Blanc et al. ................ 370/389 |
| 6,477,169 | B1 | * | 11/2002 | Angle et al. ........... 370/395.42 |
| 6,519,225 | B1 | * | 2/2003  | Angle et al. ................ 370/229 |
| 6,606,300 | B1 | * | 8/2003  | Blanc et al. ................ 370/229 |
| 6,625,121 | B1 | * | 9/2003  | Lau et al. .................... 370/230 |
| 6,628,646 | B1 | * | 9/2003  | Angle et al. ................ 370/355 |
| 6,661,788 | B1 | * | 12/2003 | Angle et al. ................ 370/390 |
| 6,667,984 | B1 | * | 12/2003 | Chao et al. ................. 370/414 |
| 6,687,247 | B1 | * | 2/2004  | Wilford et al. ............. 370/392 |
| 2002/0075883 | A1 | * | 6/2002 | Dell et al. .................. 370/413 |
| 2002/0080723 | A1 | * | 6/2002 | Hoch et al. ................. 370/248 |
| 2002/0085578 | A1 | * | 7/2002 | Dell et al. .................. 370/422 |
| 2002/0141344 | A1 | * | 10/2002 | Chidambaran et al. ..... 370/236 |
| 2003/0099242 | A1 | * | 5/2003 | Shah et al. .............. 370/395.4 |

OTHER PUBLICATIONS

Kenneth Y. Yun, "A Terabit Multiservice Switch", IEEE Micro, IEEE Computer Society, New York, Jan./Feb. 2001, pp. 58-70.

* cited by examiner

*Primary Examiner*—Alpus H. Hsu

(57) ABSTRACT

A digital switching system comprises: (a) a line card layer containing a plurality of real or virtual line cards; (b) a switch card layer containing a plurality of real or virtual switch cards; and (c) an interface layer interposed between the line card layer and the switch card layer for providing serialization support services so that one or more of the line cards and switch cards can be operatively and conveniently disposed in a first shelf or on a first backplane that is spaced apart from a second shelf or from a second backplane supporting others of the line cards and/or switch cards. Such an arrangement allows for scalable expansion of the switching system in terms of number of lines served and/or transmission rates served. The flexibility of the system is owed in part to payload data being carried within payload-carrying regions of so-called ZCell signals as the payload data moves between the line card layer and the switch fabric layer.

18 Claims, 12 Drawing Sheets

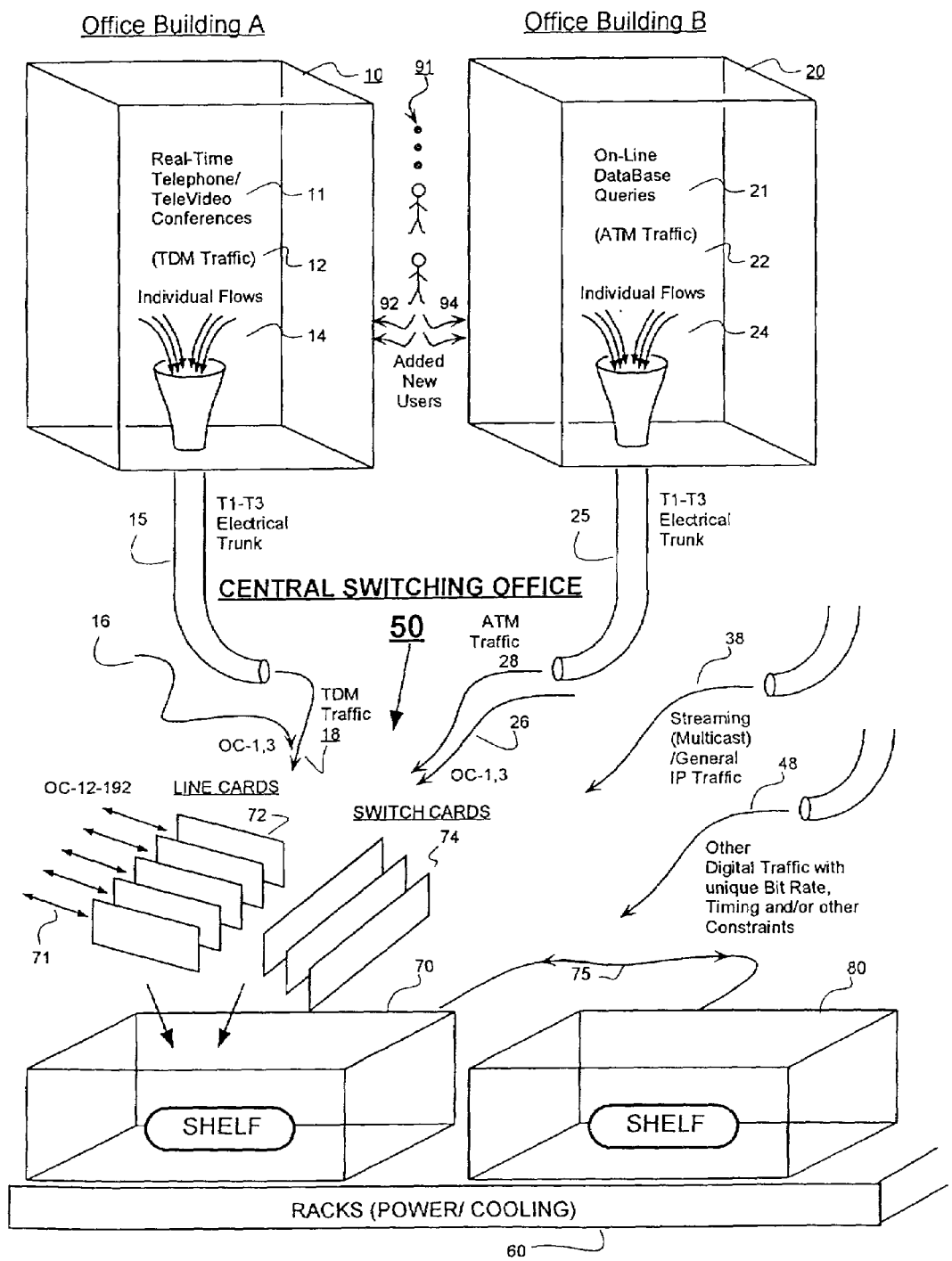

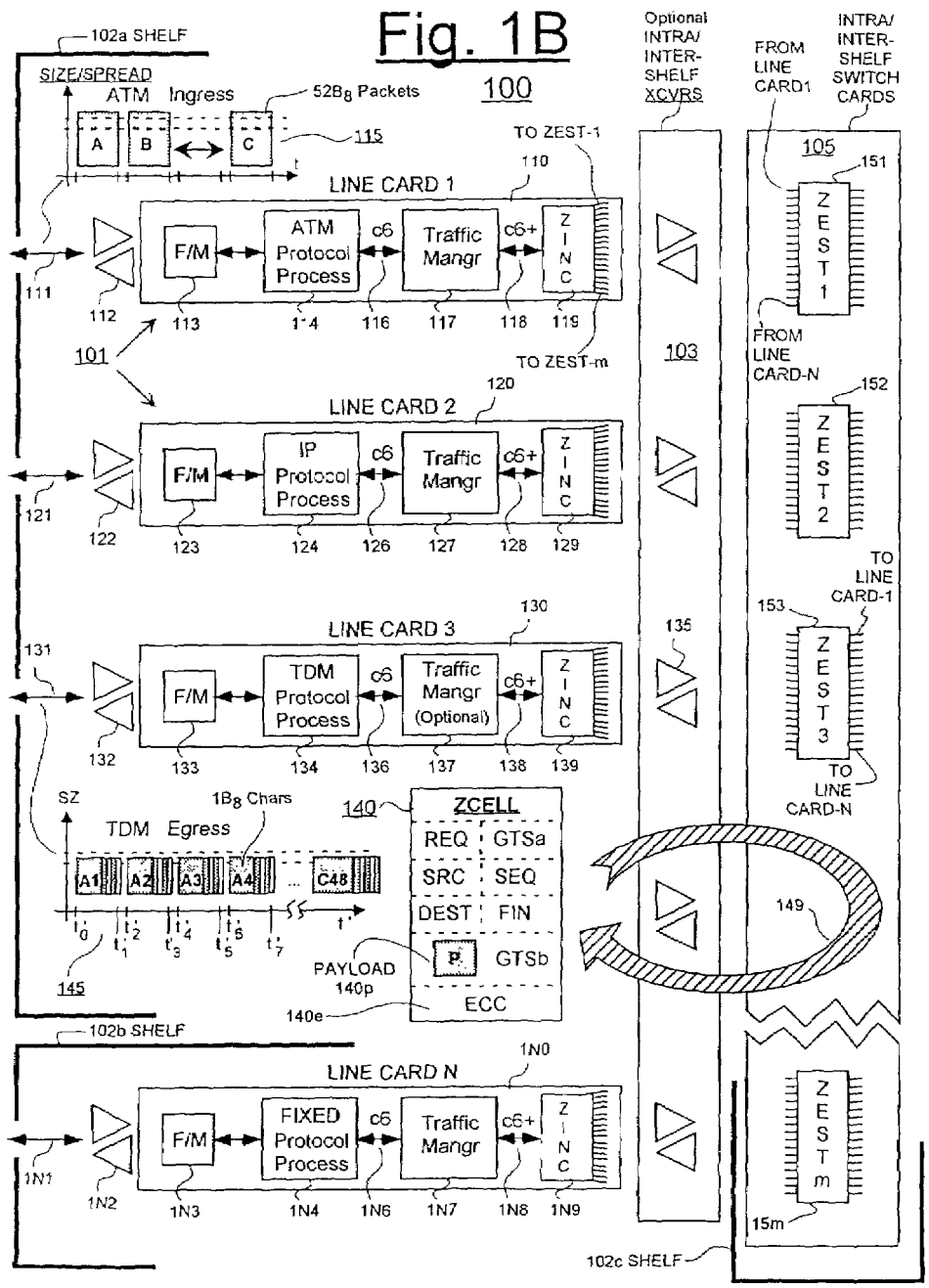

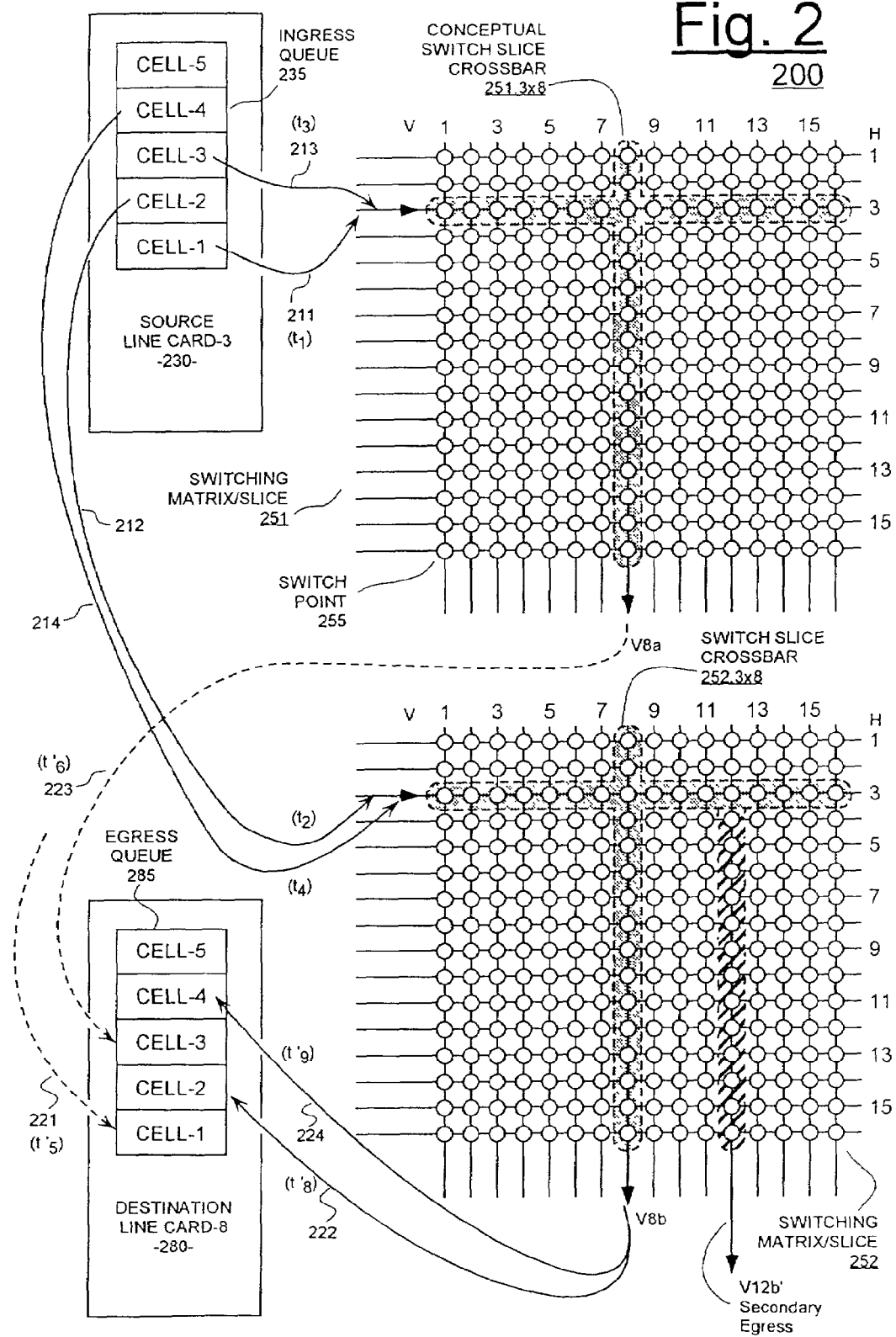

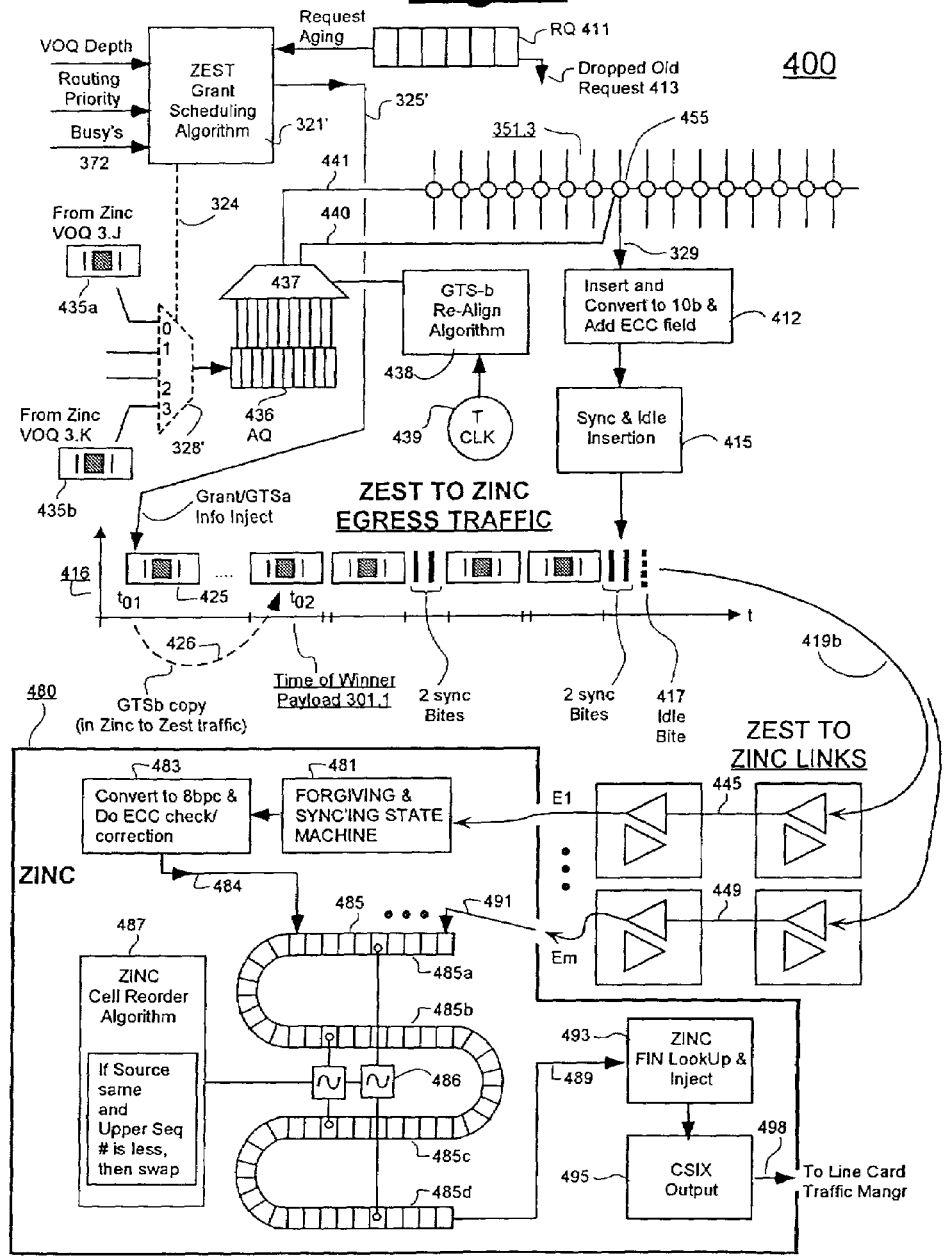

MULTISERVICE SWITCHING SYSTEM WITH DISTRIBUTED SWITCH FABRIC

CROSS REFERENCE TO CO-OWNED APPLICATIONS

The following copending U.S. patent application is owned by the owner of the present application, and its disclosures is incorporated herein by reference:

(A) Ser. No. 09/846,875, filed concurrently herewith by Christopher I. W. Norrie, Matthew D. Omes, and Gene K. Chui which is originally entitled, METHOD AND SYSTEM FOR ERROR CORRECTION OVER SERIAL LINK, now U.S. Pat. No. 6,748,567.

CROSS REFERENCE TO PATENT PUBLICATIONS

The disclosures of the following U.S. patents are incorporated herein by reference:

(A) U.S. Pat. No. 4,486,739, issued Dec. 4, 1984 to Franaszek et al. and entitled "Byte Oriented DC Balanced (0,4) 8B/10B Partitioned Block Transmission Code".

CROSS REFERENCE TO RELATED OTHER PUBLICATIONS

The following publications are cited here for purposes of reference:

(A) CSIX-L1: Common Switch Interface Specification-L1, Published Aug. 5, 2000 as Specification Version: 1.0 at Internet URL: http://www.csix.org/-csixl1.pdf.; and (B) Fibre Channel Physical and Signaling Interface (FC-PH) Rev 4.3, ANSI X3.230:1994 (available from Global Engineering, 15 Inverness Way East, Englewood, Co 80112–5704. (See also http://www.ietf.org/internet-drafts/draft-monia-ips-ifcparch-00.txt)

FIELD OF INVENTION

The present disclosure of invention relates generally to digital telecommunications. It relates more specifically to the problem of switching high-rate digital traffic from traffic source lines to dynamically-assigned traffic destination lines in a scalable manner. It relates furthermore to the problem of moving digital traffic from a first digital telecommunications line operating under a first transmission protocol to a second line operating under a possibly different, second transmission protocol.

DESCRIPTION OF RELATED ART

Some of the recently-witnessed explosions in volume of traffic over digital telecommunications networks may be attributed to transmissions other than that of the popular http://www kind. There are many other kinds of protocols. In the well-known, World Wide Web (www) part of the Internet, multitudes of Internet Protocol (IP) packets typically snake their way through mazes of parallel paths and/or routers in such a way that corresponding and eye-catching web pages or like outputs can develop at respectively intended destinations. IP packets may arrive at a given destination in random order due to different path traversal times or encountered errors. The destination computer is expected to re-assemble the content pieces carried by the IP packets in a jigsaw-puzzle-like manner so that the reassembled pieces closely resemble the whole of what was sent out.

Because the content-pieces carried by IP packets do not need to all arrive, or arrive at specific times, or in specific orders, IP traffic may be respectively characterized as being flexible in terms of content completion, as being temporally flexible and as being sequentially flexible. In other words, no one IP packet necessarily has to arrive at the destination at all, or at a specific time, or in a specific sequential order relative to other packets of a given page. Computer software at the destination end typically sorts through and reassembles the pieces of the jigsaw puzzle slowly and as best it can, sometimes filling blank spots with best-guesses, this depending on which IP packets arrive first and what prior history and knowledge is available about the web page that is being pieced together. Users often experience this process by seeing a web image slowly crystalize on their screen as detail-carrying packets arrive randomly. Users may not even realize that some top parts of the web page may have filled in after bottom parts because respective detail-carrying packets were re-transmitted at the end of the stream when the TCP protocol processor detected that they were missing from the top of the stream and requested their re-transmission.

There are many other telecommunications protocols for which such flexibilities in delivery timing and order are not acceptable. For example, the content of some telecom flows may require real-time continuity, high bandwidth, and adherence to a specific sequence of payload delivery. More specifically, the latter content may include digitized, cellular telephone conversations and/or digitized TeleVideo conferences whose flows may need to remain in-sequence, uninterrupted, and whose latency may need to be maintained relatively small so that end users perceive their exchanges as occurring in the present tense and without detectable gaps. Such time-wise and order-wise constrained communications can contribute to the recently observed, exponential growths of digital traffic as much as does the more popularly-known IP traffic. Scalable and efficient methods are needed for moving both kinds of traffic through telecommunications networks.

Growth of traffic may be further attributed to yet other forms of digital content which allow for some perturbations in latency and/or real-time continuity such as may be allowed to occur when computer databases are queried on an 'on-line' or real-time basis. Users of the latter are often willing to wait a short while for results to come pouring back. Given that there is a spectrum of different kinds of traffic extending from those which have very strict requirements for on-time and sequential delivery of payload data to those (e.g., IP) which have very loose requirements for on-time and sequential delivery, it is desirable to develop scalable and efficient methods for moving all kinds of traffic within this spectrum through telecommunications networks.

Often, the required bandwidth, continuity, and low-latency requirements of real-time voice, TeleVideo, or like communications is met and maintained by using Time-Domain Multiplexing (TDM) schemes. The allowed perturbations in other types of digitized traffic may be more efficiently handled by using an Asynchronous Transfer Mode (ATM) protocol or the like. The same or yet other forms of digitized traffic may have a multicast aspect to them wherein cells or packets of digitized data, such as those of streaming IP video may be efficiently handled by simultaneously transmitting the packets to many destinations rather than by unicasting them as individual flows each from a single source to a specifically addressed destination.

The growing popularity of various forms of digitized telecommunication schemes such as ATM, TDM, IP and so forth, can create a large set of problems at central switching offices. Switching bandwidth often needs to be pushed to higher and higher levels as larger amounts of traffic try to move through the switching fabric of a given central office. This can place excessive burdens on the technology that is used to implement the switch fabric at the office. The latter can undesirably push the cost of implementation to unacceptable levels as switching office designers try to keep up with the increasing demands for higher switching bandwidth and the demand for handling different kinds of protocols.

Moreover, as geographic diversity in the end user population continues to grow, and/or more users join the fray, the number of switch-wise interconnectable lines tends to grow at the central switching offices. This is so because more lines are often need for servicing greatly spaced apart locations and/or growing populations of end users. In view of this, the scalability of switching systems becomes an ever-growing problem.

Yet another problem is that of cross-protocol traffic. Equipment at one end of a digitized telecommunications connection may be operating under a TDM regime while equipment at another end is operating under an ATM scheme. The respective end users at both ends may not know that. Yet they may implicitly ask a central switching office to transfer payload data from one type of service line (e.g., TDM) to a different type of service line (e.g., ATM). Designers of switching office equipment may encounter many difficulties in providing for such multiservice transfers in an economical way.

Yet a further problem is that of bandwidth granularity. Switching office equipment may provide fixed quantums of throughput rates for each of its routed flows, particularly in the TDM domain. Some customers, however, may not need the full extent of the bandwidth allocated to them. The extra bandwidth is wasted. At the same time, there may be other customers who need more bandwidth than that which appears to be currently available for them. There is need for an ability to finely tune the amount of bandwidth allocated to each communication flow.

SUMMARY OF INVENTION

Structures and methods may be provided in accordance with the present disclosure for overcoming one or more of the above-described problems. More specifically, in accordance with one aspect of the present disclosure, a distributed switch fabric is provided with an ability to grow in size and speed as higher volumes or higher rates of traffic throughput are called for. In accordance with another aspect of the present disclosure, conversion mechanisms are provided so that ingress traffic coming in on a first telecommunications traffic line may easily egress to a different destination line even though the first line operates under a first transmission protocol (e.g., ATM) and the second line uses a different transmission protocol (e.g., TDM).

A switching system in accordance with the present disclosure comprises: (a) a line card layer containing a virtual plurality or physical plurality of line cards; (b) a switch card layer containing a virtual plurality or physical plurality of switch cards; and (c) an interface layer interposed between the line card layer and the switch card layer for providing serialization support services so that, if desired, one or more of the line cards and switch cards can be interconnected to the others in a highly serialized manner and can thereby be operatively and conveniently disposed in a first shelf or on a first backplane that is spaced apart from a second shelf or a second backplane supporting others of the line cards and/or switch cards. The interface layer preferably includes high-speed optical and/or electrical, serializing, de-serializing, and signal transmitting means while the line card layer and switch card layer each includes means for converting codes between the more-serialized, optical and/or electrical signal domain of the interface layer and a less-serialized, electrical signal domain.

A switch fabric structure in accordance with the present disclosure comprises the whole or a subset of: (a) a set of switching fabric interface chips (ZINC chips) for queuing up payload data for passage through a switching chips layer and for receiving switched payload data that has passed through the switching chips layer; and (b) a set of switching chips (ZEST chips) distributed in said switching chips layer and operatively coupled to the ZINC chips for receiving payload data sent from the ZINC chips, routing the received payload data back to the ZINC chips in accordance with received routing requests; (c) wherein the payload data is carried within payload-carrying regions of so-called ZCell signals as the payload data moves between the ZINC and ZEST chips; and wherein each ZCell signal comprises at least one of: (c.1) a dual-use, request and grant field for carrying one or more routing requests when moving from ZINC to ZEST, and for carrying grant information when moving from ZEST to ZINC; (c.2) at least when moving from ZINC to ZEST, a combination of a payload-carrying field and another field for carrying a payload-associated, Grant Time Stamp (GTS-b), where the GTS-b identifies a time slot within a destination ZEST chip during which the associated and co-carried payload will be switched for egress to a request-defined one or more of the ZINC chips; (c.3) at least when moving from ZEST to ZINC, a combination of a source ZINC identifier (SLIN) and a payload sequence identifier for respectively identifying a ZINC chip from which the payload ingressed into the switching chips layer and for identifying a spot within a sequence of payloads at which the ZINC-carried payload is to be disposed; and (c.4) an error checking and correcting field (ECC) adapted for use in DC-balanced transmission paths and covering included ones of items (c.2) and (c.3).

A manufactured and transmittable signal (ZCell), that is structured in accordance with the present disclosure for transmission between a switch fabric layer and a line card layer, includes one or more of: (a) a dual-use, request and grant field for carrying one or more routing requests when moving from the line card layer to the switch fabric layer, and for carrying grant information when moving from the switch fabric layer to the line card layer; (b) at least for when moving from the line card layer to the switch fabric layer, a combination of a payload-containing field and another field for carrying a payload-associated, Grant Time Stamp (GTS-b), where the GTS-b identifies a time slot within a destination part of the switch fabric layer during which the associated payload will be switched for egress to a request-defined one or more parts of the line card layer; (c) at least for when moving from the switch fabric layer to the line card layer, a combination of a source identifier and a payload sequence identifier for respectively identifying a part of the line card layer from which the payload ingressed into the switch fabric layer and for identifying a spot within a sequence of payloads at which the line card layer-carried payload is to be disposed; and (d) an error checking and correcting field (ECC) adapted for use in DC-balanced transmission paths and covering included ones of items (c) and (d) of the manufactured and transmittable signal (ZCell).

A switching method in accordance with the present disclosure comprises a subset or the whole of the steps of: (a) in a switch card layer, loading flow contents into respective ones of Virtual Output Queues (VOQ's), where each VOQ is associated with a respective unicast destination or a prespecified set of multicast destinations; (b) conducting bidding competitions between subsets of the VOQ's to determine which of one or more smaller number of VOQ's will be allowed to submit a passage request to a subset-associated part (e.g., ZEST chip) of a switching fabric layer; (c) stuffing bid-winning ones of the passage requests into respective ZCell signals for transmission to the subset-associated parts of the switching fabric layer; (d) first converting the request-stuffed ZCell's to a serialized optical or electrical transmission coding domain (e.g., 10 bits per character, abbreviated herein as '10 bpc'), adding ECC fields and inserting sync bites; (e) transmitting the first converted ZCell's with ECC fields and sync bites by way of serialized optical and/or electrical transmission medium in an interface layer to the switching fabric layer; (f) second converting the request-stuffed ZCell's to a more parallel (slower rate per wire) electronic processing domain (e.g., coded as 8 bits per character, abbreviated herein as '8 bpc'); (g) in the switch fabric, conducting grant competitions between received requests from the VOQ's to determine which of one or more smaller number of VOQ's will be allowed to submit a payload for passage through a grant-associated part (e.g., ZEST chip) of a switching fabric layer and at an allocated time slot; (h) injecting grants and corresponding first Grant Time Stamps (GTSa) into respective ZCell signals for transmission back to the request-associated parts of the line card layer; (i) third converting the grant-carrying ZCell's to serialized optical or electrical transmission domain (e.g., 10 bpc), adding ECC fields and inserting sync bites and idle bites; (j) transmitting the third converted ZCell's with ECC fields and sync bites and idle bites by way of serialized optical or electrical transmission medium in an interface layer to the switch card layer; (k) fourth converting the grant-carrying ZCell's to a more parallel electronic processing domain (e.g., 8 bpc); (l) in the line card layer, inserting grant-winning payloads and associated second Grant Time Stamps (GTSb) into respective ZCell signals for transmission back to the grant-giving parts of the switching fabric layer; (m) fifth converting the payload-carrying ZCell's to serialized optical or electrical transmission domain (e.g., 10 bpc), adding ECC fields and inserting sync bites; (n) transmitting the fifth converted ZCell's with ECC fields and sync bites by way of serialized optical or electrical transmission medium in an interface layer to the switching fabric layer; (o) sixth converting the payload-carrying ZCell's to more parallel electronic processing domain (e.g., 8 bpc); (p) in the switch fabric layer, re-aligning the ZCell-carried payloads according to their respective, second Grant Time Stamps (GTSb) and switching the re-aligned payloads through the switch fabric layer during time slots associated with their respective, second Grant Time Stamps (GTSb); (q) seventh converting the switched payload-carrying ZCell's to serialized optical or electrical transmission domain (e.g., 10 bpc), adding ECC fields and inserting sync bites and idle bites; (r) transmitting the seventh converted ZCell's with ECC fields and sync bites and idle bites by way of serialized optical or electrical transmission medium in an interface layer to the line card layer; (s) eighth converting the switched-payload-carrying ZCell's to more parallel (less serialized) electronic processing domain (e.g., 8 bpc); (t) in the line card layer, re-ordering received ones of the switched-payloads according to accompanying source and sequence designations; (u) attaching destination-based flow identification numbers (FIN) to the re-ordered and switched-payloads; and (v) forwarding the FIN-bearing switched-payloads to their respective destination lines.

A protocol conversion mechanism in accordance with the present disclosure comprises (a) receiving in a source line card, payload data that is transmitted according to a first transmission protocol (e.g., ATM); (b) re-arranging the received payload data for carriage in payload-carrying sections of intermediate transmission signals (ZCell's); (c) transmitting the re-arranged payload data along with dynamically-assigned, Grant Time Stamps (GTSb's) to a switching chip (ZEST chip); (d) in a time slot designated by the carried-along Grant Time Stamp (GTSb), switching the re-arranged payload data through the switching chip; (e) transmitting the switched payload data along with associated source and sequence designations to a line card chip (ZINC chip) of a destination line card; and (f) in the destination line card, re-arranging the switched and transmitted payload data for further transmission according to a second transmission protocol (e.g., TDM) that is different from the first transmission protocol.

Other aspects of the invention will become apparent from the below detailed description.

BRIEF DESCRIPTION OF THE DRAWINGS

The below detailed description section makes reference to the accompanying drawings, in which:

FIG. 1A is a block diagram that shows how a central switching office may be called upon to service digital telecommunications traffic having different transmission protocols and growing bandwidth demands;

FIG. 1B is a schematic diagram of a system in accordance with the invention that has a distributed switch fabric and an ability to switch traffic which is ingressing from a first line that uses a respective first telecommunications protocol to a second line which uses a respective but different second telecommunications protocol;

FIG. 2 is a conceptual diagram showing how multiple switch slices may be used in parallel to increase payload-throughput rates of a switch fabric;

FIG. 4 is a conceptual diagram showing how traffic egressing from a ZEST chip to a ZINC chip may be managed within one embodiment in accordance with the invention;

DETAILED DESCRIPTION

Figure 1C:
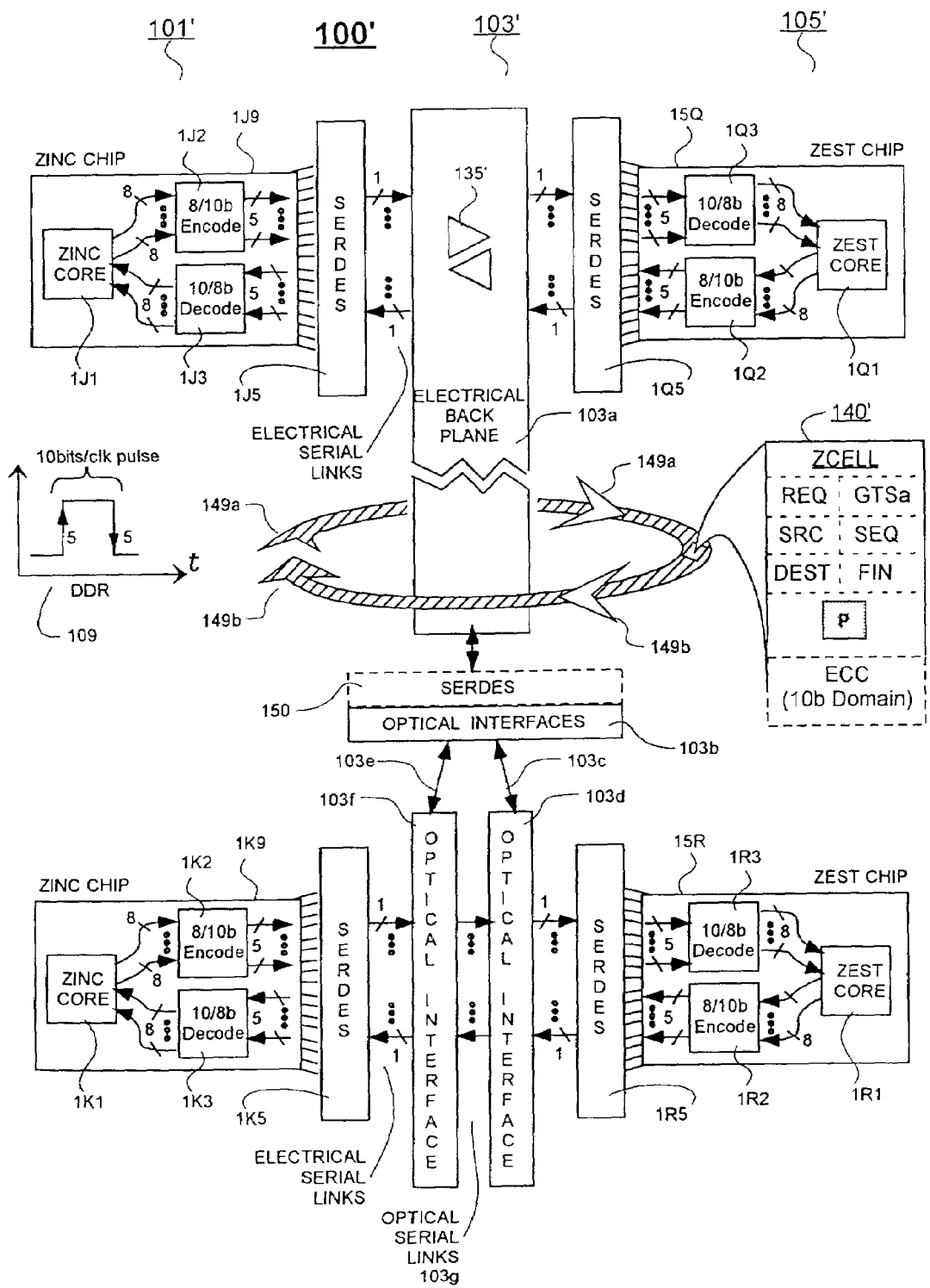
FIG. 1C is a schematic diagram showing possible embodiments for a serialized line-to-switch interface layer of the system of FIG. 1B.

FIG. 1A is a block diagram of a digital telecommunications environment 90 to which the here disclosed invention may be applied. Environment 90 is assumed to be experiencing usage growth 91 either within one, or more typically among plural ones of different types of digitized telecommunications traffic such as TDM traffic 12 and ATM traffic 22.

In the illustrated environment 90, a first office building (A) or company campus 10 is assumed to be filled predominantly with digital telephone equipment and/or digital TeleVideo equipment 11. Users 92 of this equipment typically expect their respective telephone or TeleVideo conferences to occur essentially in real time and without perceivable and disruptive breaks of continuity. Because of this, the telecom manager of building/campus 10 has chosen a Time Domain Multiplexing (TDM) protocol 12 as a common exchange scheme for use in the first office building/campus 10. The TDM traffic of building/campus 10 may feed through a corresponding one or more of T1 or T3 rated electrical trunk lines 15 that service that building or campus 10. Each of the individual conference flows 14 within the TDM traffic 12 may be guaranteed specific time slots with a certain periodicity so that the corresponding conference flow can maintain a respectively prespecified (e.g., constant) bandwidth for its telephone or TeleVideo conference and/or so that the corresponding conference appears to be uninterrupted and of high fidelity to its respective users.

By contrast, a second office building or campus 20 may be filled predominantly with telecommunications equipment that is better served by Asynchronous Transfer Mode (ATM) traffic 22. An example could be computer equipment that performs on-line database queries 21. Some variance in the time delay between packets of an individual flow 24 may be acceptable to end users 94 in such situations. The ATM protocol may be used to provide more efficiently aggregated and time multiplexed usage of the bandwidth in the corresponding T1 or T3-rated electrical trunk lines 25 that service the corresponding building/campus 20.

It is of course understood that many replications of the illustrated buildings or campuses, 10 and 20, may be dispersed geographically in a given community or even around the world and that end users in these buildings/campuses may wish to exchange digitized data with counterpart users in others of the buildings/campuses. Telecom traffic in the multitudes of buildings or campuses may be limited to specific kinds of protocols such as TDM, ATM, IP, and so forth. Alternatively, the localized traffic may be constituted by various mixtures of such digitized data traffic moving in respective links.

The T1–T3 traffic of electrical lines 15 of building/campus 10 may merge with like TDM-based electrical traffic signals of other like lines such as 16 and may be multiplexed at higher transmission rates onto a fiber optic link such as 18 that carries TDM protocol traffic. Typically, the transmission rate of such a fiber optic link 18 may be denoted as OC-1 or STS-1 or 51.84 Mbps (megabits per second). Multiple ones of such fiberoptic links may merge together onto yet higher-rate transmission links that can be rated in the range of OC-1 to OC-192 (where OC—N corresponds to Nx51.84 Mbps; N=1,2 . . . 192). These higher-rated transmission links connect to a central switching office 50.

Similarly, for campuses like 20, the corresponding ATM traffic 22 of trunk lines 25 and 26 may be carried by higher-rated optical or electrical backbone links 28 rated at OC-1 or OC-3 or higher. Multiple ones of such ATM traffic flows may merge into yet higher-rated transmission links which operate at rates such as OC-12 through OC-192. These higher-rated transmission links may also connect to the illustrated central switching office 50.

As implied by FIG. 1A, the high-rate TDM traffic 18 (which may be rated as OC-1 through OC-192 or higher or lower) is to be routed through the central switching office 50 so that respective packets or cells or like data-containing units of individual TDM flows 14 are directed from respective ingress lines to respectively-assigned destination lines. High-rate ATM traffic 28 (operating at OC-1 through OC-192 or higher or lower) may similarly enter the central switching office 50 with a need for respective packets of ATM traffic 22 to be switched from an incoming source line 28 to dynamically-assigned destination lines based on the individual flows 24 of such ATM traffic.

Because of the many customers that may need to be serviced and/or because of the sheer volume of traffic that may need to be routed through the central switching office, the office 50 may be filled with many racks 60 of switching equipment. Each of the racks 60 may support a plurality of respective shelves of switching circuitry, in both a physical and electrical as well as environmental sense. For purposes of simplified example, FIG. 1A shows just one rack 60 supporting two shelves, 70 and 80. It is understood that the typical office 50 will have many more racks and that each such rack may support many more shelves.

Each shelf (70 or 80) may be filled with a plurality of line cards 72 and one or more switching cards 74 modularly inserted into a frame, motherboard or backplane portion of the shelf. Each of line cards 72 may be assigned to handle the traffic of a corresponding link line 71, where the link line's throughput speed may be rated as OC-1 through OC-192, or higher or lower. Each of links 71 may be bidirectional (full duplex) such that it can simultaneously service ingressing and egressing traffic for its corresponding fiber optic or other cable. Ingressing traffic may be directed to one of the switch cards 74 and thereafter switched through the switch card 74 for egress from another of the line cards 72.

A number of problems can arise from the arrangement shown in FIG. 1A. First, there is often a physical limit to how many link lines 71, line cards 72 and switch cards 74 may be crowded into the frame or motherboard card slots of a given shelf 70. There may also be a limit on how much power and/or cooling ability (60) may be concentrated into a given shelf 70. Because of this, the number of link lines 71 that a given shelf 70 can service may be limited to a fairly small number such as sixteen or less (<16). However, as telecommunications usage increases, more bidirectional traffic link lines 18 may have to be brought into the central switching office 50 and more shelves such as may 80 need to be added in order to service the new lines. Interconnections 75 such as between line cards of different shelves 70 and 80 may need to be provided so that switching of traffic amongst different line cards 72 of the respective shelves 70, 80 and racks 60 may be supported.

This form of expansion can lead to excessive time delays and can be undesirably expensive because each shelf of switching equipment tends to be expensive by itself and because numerous line cards 72 may be consumed simply for supporting multi-layered switching of inter-shelf traffic 75. A better approach is needed for expanding the capabilities of a central switching office 50 as telecommunication usage scales up.

Another problem that may arise within the arrangement shown in FIG. 1A is that of cross-protocol traffic. What happens if a user 94 in building 20 (ATM traffic) wishes to send a video file to a user 92 in building (TDM traffic)? The ATM video packets that egress from building 20 may be separated by variable periods. The corresponding TDM traffic stream that enters building 10 is of a constant, fixed rate nature. There may be differing requirements for clock synchronization jitter or other such telecommunication attributes between the differing transmission protocols (e.g., ATM of building 20 and TDM of building 10). The question becomes whether the central switching office 50 can handle such cross-protocol traffic, and if so, how efficiently. Specialized and complicated equipment may be needed to convert one form of traffic to another.

As seen in FIG. 1A, cross-protocol traffic is not limited to merely TDM and ATM traffic. Other bidirectional cables that enter the switching office 50 may carry streaming or general Internet Protocol (IP) traffic 38 or other digital traffic 48 having unique bit rates, timing constraints, and other telecommunications constraints. As new types of protocols are added, the problem of providing switching services between different protocols becomes more and more complex. An economic and scalable solution is very much needed.

FIG. 1B is a schematic diagram of a switching system 100 in accordance with the invention that can provide solutions to the above problems. In terms of a broad overview, system 100 comprises a line card layer 101, a switch fabric layer 105, and a line-to-switch interface layer 103.

The line card layer 101 (also referred to herein as the traffic ingress/egress layer 101) may comprise a plurality of N line cards (either virtually or physically) and these may be respectively denoted as 110, 120, 130, ... 1N0, where N can be a fairly large number such as 32 or 64 or larger. The switch fabric layer 105 may have a plurality of m switching chips (either virtually or physically) and these may be respectively denoted as 151, 152, 153, ... 15m; where m can be an integer selected from a range of numbers such as 2 through 16 inclusively, or higher. The line-to-switch interface layer 103 may be merely a wired backplane for coupling the switching chips 151–15m to the line cards 110–1N0. In the more typical configuration however, the line-to-switch interface layer 103 should comprise a plurality of high-speed electrical or optical transceivers 135 for carrying serialized data and/ for converting between optical and electrical domain (if applicable). The interface layer 103 should further include SERDES devices (SERializing and DESerializing units, not shown, see instead FIG. 1C) for converting between more serialized transmission techniques used at the core of interface layer 103 and more parallel transmission techniques used at the boundaries of interface layer 103. Use of high-speed optical and/or electrical transceivers 135 and SERDES (not shown) in layer 103 allows for the serialization of inter-card communications signals and for reduction of numbers of wires or optical fibers or optical paths so that various ones of the line cards can be conveniently located in different shelves such as 102a or 102b. Additionally or alternatively, use of the transceivers 135 and SERDES (not shown) in layer 103 allows the switching chips 151, 152, ... 15m to be conveniently located in one or more different shelves such as 102c. Although FIG. 1C depicts the serialization and de-serialization functions of the SERDES devices as being carried out within the interface layer, that depiction does not preclude such SERDES devices from being physically placed on respective ones of the line cards and switch cards. The depiction also does not preclude part or all of the serialization and de-serialization functions of the SERDES devices from being monolithically integrated into respective ones of the ZINC and ZEST chips. Of course, if such monolithic integration is to be carried out, the latter ZINC and ZEST chips should use an appropriate high speed transistor technology for supporting the high frequency switching rates of the serialized data streams. Conversely, code conversions such as between the 8 bpc/10 bpc or like domains may be carried out externally to the ZINC and ZEST chips even though one set of embodiments disclosed here has the code conversions being carried out in monolithically integrated fashion within the ZINC and ZEST chips. These variations of theme on where the serialization and de-serialization functions should be carried out, and/or where the respective 8 bpc/10 bpc or like code conversion should be carried out, are within the scope of the present disclosure.

A circulating stream 149 of payload-and/or-control carrying signals, referred to herein as ZCells (140), flows through the line-to-switch interface layer 103, between the traffic ingress/egress layer 101 and the switch fabric layer 105. The ingress and egress traffic payload data of each given line card, 110–1N0 is carried within a payload section 140p of the ZCells 140 that circulate between the given line card and the switch fabric layer 105. The payload section 140p also contains an associated, with-payload Grant Time Stamp (GTS-b) whose function will be detailed below.

Each ZCell 140 may further include an Error Checking and Correction (ECC) field 140e which is designed for supporting error-free traffic through the line-to-switch interface layer 103. The ECC field 140e should be specifically designed for at least correcting one-bit burst errors. Such one-bit burst errors and the like are particularly prone to occur in the serialized traffic streams of the interface layer 103 for a number of reasons. First, edges of data bit pulses may be undesirably, and excessively skewed or temporally displaced in certain parts of the serialized transmission streams such that the skews and/or temporal displacements result in sporadic mis-samplings of individual bits as they move through the more-serialized portions of the interface layer 103. Such edge skews and/or edge mis-synchronizations may be particularly problematic at inter-board connection points where electrical capacitances tend to be relatively high and therefor tend to filter out high frequency parts of the edge waveforms. One-bit burst errors may also occur due to clock synchronization problems in the serialized streams such as where clock recovery errors occur at the beginning of an incoming bit stream sequence. Serialized traffic may also be exposed to sporadic voltage spikes as it moves through the interface layer 103. Additionally, the latter interface layer 103 may contain concentrations of electrical and/or optical transceivers and/or different-length/speed links 135 whose closeness to one another or to other signal sources may increases the chances of cross-coupled, burst noise. The ECC field 140e should be designed to counter the increased chance of burst noise insertion in the interface layer 103 and should be designed to operate in the serialized domain (e.g., 10 bpc domain) found at the core of the interface layer 103.

Each ZCell 140 may further include source (SRC) and sequence number (SEQ) fields for identifying an order of payload (P) cells as originally seen when the payload cells (P in section 140p) ingress through a given, source line card (e.g., 110). Each ZCell 140 may further include either a Switch Request field (REQ) or a pre-payload Grant Time Stamp (GTS-a) field disposed in a shared field of the ZCell. The REQ field may be used for requesting a pass-through time slot for a given part (slice crossbar) of a switching chip (a ZEST chip). The pre-payload GTS-a field may be used for identifying a future time slot for carrying out switching, where that future time slot is measured within the timing reference frame of the switch fabric. A copy or derivative (GTS-b) of the original GTS-a field may be carried back to the switch fabric by a future ZCell, where that future ZCell carries the payload 140p that is to switch through a given switching chip 151–15m at a time designated by the original GTS-a field. These and other fields (e.g., DEST, FIN) of the ZCell 140 and their respective functions will be described in yet more detail later below.

From the broad overview perspective of FIG. 1B, it may be seen that each line card, such as 110, is associated with a corresponding bidirectional link line 111. (Line cards 120–1N0 have respective link lines 121–1N1.) If the bidirectional link line 111 is optical, then appropriate optical/electrical transducers and serializing and de-serializing buffer (SERDES) circuits 112 may be provided between the link line 111 and its corresponding line card 110 for interfacing with the primarily electrical and more parallel components of the line card. Within the line card 110, a bidirectional framer/mapper chip 113 may be included for providing physical layer interfacing with the signals of the corresponding link line 111. Such framers/mappers are known in the art and therefore will not be detailed herein. Examples of such F/M chips 113 include those that provide SONET-compliant interfacing or 1 Gbps Ethernet-compliant physical layer (PHY) interfacing. On example is the S4801 chip from Applied Micro Circuits Corp. (AMCC) of San Diego, Calif. Another example is the S19202 chip which is also available from AMCC.

Within each line card, and coupled to the F/M chip 113, is a network protocol processing chip 114 which provides appropriate media access (MAC) protocol handshaking with the link line 111 as required by the traffic protocol of that line 111. In the given example line 111 is assumed to be carrying ATM traffic and therefore the protocol processing chip 114 is of the ATM type.

The protocol processing chip also can operate to repackage payload data and overhead bits into sizes that are more compatible with herein-described ZCell formats. In the example of line card 2 (120), the corresponding link line 121 is assumed to be carrying Internet Protocol traffic. Those skilled in the details of Internet Protocol know that packets can come in a wide variety of sizes depending on where in the routing hierarchy, such packet size is measured. Typically, on the central office link side 121, the IP packets will be about 1500 bytes long or bigger or smaller depending on circumstances. If that is the case, one of the jobs of the protocol processing chip 124 can be to repackage the link line data (121, after framing/mapping of course) into packets (e.g., 64 byte packets) of lengths that are compatible with the herein-described ZCell format such that the repackaged packets are of lengths equal to or less than payload-carrying sections 140p of the ZCells, or of lengths that are whole number multiples of the ZCell payload-carrying sections. In the case of IP protocol processing chip 124, it may be therefore adapted for segmenting received IP traffic so as to provide correspondingly repackaged IP protocol packets of ZCell-compatible lengths such as 64 bytes, or 128 bytes, or 256 bytes, etc., or slightly smaller packets (with minimized slack space) if the payload-carrying sections 140p of the ZCells is 64 bytes long. The protocol processing chip thereafter converts the repackaged line stream into an industry-standard CSIX format 126. In alternate embodiments, the soon-described traffic manager chip 127 may instead perform the function of chopping large packets (e.g., 1500 bytes or longer) apart and repackaging their data into smaller packets (e.g., 64-byte packets). It is also possible to have the protocol processing chip 124 chop down the size of packets to an intermediate length and then to have the traffic manager chip 127 perform the subsequent job of chopping and further repackaging the already-repackaged data into 64-byte packets or the like, which are compatible with the payload-carrying sections 140p of the ZCells.

For the illustrated case of line card 3 (130), the corresponding link line 131 is assumed here to be carrying TDM traffic and the protocol processing chip 134 is therefore adapted for processing such TDM traffic. Although for purpose of illustration, FIG. 1B shows each line card as having a different protocol associated with it, it is fully within the contemplation of the present disclosure to have a switching system 100 wherein two or more, or even all of the line cards operate under a same telecom protocol. The line cards are modularly removable and insertable into their respective shelves so that different mixes of different protocol traffic may be accommodated as desired. The protocol processing chips, 114, 124, 134, . . . , 1N4 are responsible for repackaging their respective link line streams in the ingress direction into packets or cells that are CSIX compatible, and ZCell compatible, and for repackaging their respective CSIX egress streams into outgoing transmission streams that are compatible with the respective link line, 111, 121, 131, . . . , 1N1.

The ingress-direction outputs of the respective protocol processing chips 114, 124 . . . , 1N4 could, for example, conform to a proposed industry standard exchange such as the above-cited CSIX format (Common Switch Interface Specification-L1) The CSIX ingress-direction output of each protocol processing chip feeds a corresponding traffic manager chip within the corresponding line card. The egress-direction output of each traffic manager chip feeds a corresponding protocol processing chip. Accordingly, bidirectional CSIX interfaces such as 116, 126, 136, . . . , 1N6 are provided in the respective line cards between the respective protocol processing chips (e.g., 114) and traffic manager (e.g., 117).

A further, bidirectional CSIX compatible interface (e.g., 118) is provided in each line card between the respective traffic manager chip (e.g., 117) and a switching fabric interface chip (e.g., ZINC chip 119) provided on the line card. This second CSIX compatible interface 118 may be supplemented to additionally support a turbo traffic mode between the traffic manager chip (117) and the ZINC chip (119) as will be detailed below.

Each ZINC chip, such as 119, 129, 139 . . . 1N9 has a plurality of m ZCell egress ports and a same number, m, of ZCell ingress ports. Each port may be 5 parallel bits wide (optionally with DDR—Dual Data Rate clocking) or 10 parallel bits wide or it may be more-serialized as appropriate. Typically, serialization down to a 1 bit wide ingress or egress stream occurs in interface layer 103, at the boundary where the interface layer 103 meshes with the ZINC chips. Respective ones of the first through m[th] egress/ingress ports on a given ZINC chip (e.g., 119) should couple by way of interface layer 103 to a respective one of switch fabric chips 151–15m. Each such switching chip 151–15m is also referred to herein as a ZEST chip (ZCell-based Enhanced Switch Technology chip). Thus, the ZINC chip (ZCell-based INterface Connecting chip) 119 on line card 1 should connect to each of ZEST 1 through ZEST m.

Each ZEST chip (e.g., 151) has a plurality of N ZCell ingress ports and a plurality of N ZCell egress ports, each corresponding to a respective one of line cards 110 through 1N0. It is possible in alternate embodiments to have 2:1 or other, none-1:1 ratios between number of ingress ports per ZEST chip versus number of line cards and to have none-1:1 ratios between number of egress ports per ZEST chip versus number of line cards. But to keep things simple here, we focus here on the 1:1 ratio arrangement. Again, each ZEST port may be 5 parallel bits wide (optionally with DDR) or 10 parallel bits wide or it may be more-serialized as appropriate. Typically, serialization down to a 1 bit wide ingress or egress stream occurs in interface layer 103, at the boundary where the interface layer 103 meshes with the ZEST chips.

A given line card such as 110 may try to selectively distribute its ingress traffic cells through its respective ZINC chip 119 for simultaneous switching through all m of the ZEST chips 151–15m. This would give the line card a relatively maximal throughput of payload (the P's in the ZCells 140 the line card sends out) through the switch fabric layer 105. Alternatively, a given line card (e.g., 110) may try to push its ingress traffic cells through its respective ZINC chip (119) for switched routing through only one its one assigned ingress port of just one of the ZEST chips, say chip 153. This would give the line card a relatively minimal throughput of payload through the switch fabric layer 105. The reasons for this may be appreciated by quick reference to FIG. 2, which drawing will be further discussed below.

The traffic manager chip 117–1N7 of each respective line card 110–1N0 is typically given the responsibility of indicating which destination line or lines an ingressing stream (e.g., 115) of cells is to be directed to and under what priority (high for fast pass-through, low for slower pass-through). A subsequent ZINC chip (119) determines how to comply with such destination and priority indications by establishing how many and which of the operationally-available ZEST chips 151–15m will be asked to carry what parts of the payload traffic of its respective line card and at what internal priority levels within the switch fabric. A process by which this may be done will be described when we reach FIGS. 3A–3B.

Referring still to FIG. 1B, an important feature of the illustrated switching system 100 is that it allows for the interposing between ZINC and ZEST chips of one or more transceivers and/or different-length/speed links 135 as may be provided in the line-to-switch interface layer 103. This ability to interpose different-length/speed links 135 allows system designers to conveniently position one or more of ZEST chips 151–15m outside a shelf (e.g., 102a) that contains one or more of the line cards 110–1N0 and/or to conveniently position one or more of line cards 110–1N0 outside a shelf (e.g., 102c) that contains one or more of the ZEST chips 151–15m. In other words, the interposing of the interface layer 103 between the line card layer 101 and the switches layer 105; and the ability of the ZINC chips and the ZEST chips to cope with the variable signal-propagation delays that may be created by such an interposing of the interface layer 103, allows the switching system 100 to scale to larger sizes without being limited by how many switching devices can be crammed into a single shelf. This and related aspects may be better appreciated from FIG. 1C, which provides a schematic of one possible embodiment 100' of a switching system having respective line card layer 101', line-to-switch interface layer 103' and switches layer 105'.

As is seen in FIG. 1C, for the embodiment identified as 100', the line-to-switch interface layer 103' may include one or both of an electrical backplane 103a (e.g., a multilayer printed circuit board) and some or all of optical linking elements 103b–103g. ZCells such as 140' can travel, during an ingress phase 149a, from a given, payload-sourcing ZINC chip (e.g., 1J9 or 1K9; where J and K are selected from the series 1, 2, . . . , N) to a corresponding one or more ZEST chips (e.g., 15Q and/or 15R; where Q and R are selected from the series 1, 2, . . . , m) by traversing through one or the other or both of electrical backplane 103a and optical link elements 103b–103g. Similarly, on a return trip or egress phase 149b, a given ZCell may travel from a respective ZEST chip to a designated one ZINC chip (assuming unicasting) or to a designated plurality of ZINC chips (assuming multicasting) by traveling through one or both of the illustrated electrical and optical pathways. As a result, the round-trip time(s) for a given payload (P, or multiple copies of multicast payloads) may vary depending on what pathways through intermediate layer 103' the corresponding, and payload-carrying ZCells took during the ingress (149a) and egress (149b) phases. Control fields such as the GTS-a, SRC and SEQ fields of payload-carrying ZCells such as 140' may be used to compensate for the variable ingress and variable egress trip times of an embedded payload (P). The ECC field of each payload-carrying ZCell 140' may be used to detect and correct transmission errors encountered in the passage through the line-to-switch layer 103'.

In one embodiment, the ECC field is a 20-bit long field that is organized for DC-balanced transmission over serialized electrical and/or optical links and provides single bit correction and multiple bit detection of error for other fields of the ZCell 140' after those other fields have been specially encoded from an eight bits-per-byte domain (8 bpc domain) to a ten bits-per-character, serialized domain (10 bpc). Accordingly, it is seen in FIG. 1C that a first ZINC chip, 1J9 includes a core section 1J1 that operates in the eight bits-per-byte domain. ZINC chip 1J9, however, includes a first 8-bit to 10-bit encoder 1J2 that transforms eight-bit characters into the ten-bits per character domain (10 bpc) before forwarding such characters for serialization by serializing and de-serializing chip (SERDES) 1J5. The ECC field of ZCell 140' is inserted as a two-character addition to the ZCell during this transformation. In one embodiment, although each transformed ZCell character is 10 bits, it is physically output from its respective port of the m egress ports of its ZINC chip (e.g., 1J9) as two 5-bit-parallel bursts on opposed rising and falling edges of each clock pulse. Such a DDR scheme (Dual Data Rate) is shown graphically at 109. Thus although each ZINC egress port of that embodiment is 5-bits wide, 10 bits of data are output per local clock pulse.

The illustrated first SERDES chip, 1J5 may be provided on the line card of ZINC chip 1J9 In one embodiment, for converting the less-serialized, ten-bits-per-clock-pulse (10 bpcp) signals into corresponding one-bit serialized electrical signals before forwarding them into electrical backplane 103a and/or optical interface section 103b. In an alternate embodiment, the 10 bpcp signals can be transmitted as 5-bit wide DDR signals directly on the electrical backplane 103a, in which case the SERDES chip(s) would be position at dashed location 150 rather than solid-line positions 1J5 and 1Q5. The latter approach, however, would call for a greater number, per line card, of transmission lines on backplane 103a than does the more-serializing approach. If there are 16 ZEST chips and 64 line cards in system 100', then the line-to-switch layer 103' may be asked to support 16×64=1024 ZCell ingress pathways and a like number of egress pathways. If each such pathway calls for 5 lines, not counting clocks and other controls, that comes out to 2048× 5=10,240 wires. On the other hand, if the more-serializing approach is used, the pathway count goes down to 1,024 transmission lines (or wave guides) per direction, but the bit rate per wire of the carried signals goes up five fold to 1.25 Gbps (bits per second) per transmission line. That higher bit rate per wire places greater stress on the designers of the backplane 103a to deal with RF problems. Intermediate, partial-serializing solutions are also contemplated such as where the number of wires on backplane 103a doubles while the per-line bit rate drops to 625 Mbps or such as where the number of wires on backplane 103a is halved while the per-line bit rate increases to 2.5 Gbps.

After being output from a ZINC chip such as 1J9 (and optional first SERDES 1J5), the ZINC-to-ZEST ingress traffic (149a) continues from the intermediate layer 103' into a second, optional SERDES chip such as 1Q5 or 1R5. Within the respective, receiving ZEST chip (15Q or 15R), a ten bit-to-eight bit decoder (1Q3 or 1R3) returns the receive signal to the eight bits-per-byte domain and forwards the transformed data to the corresponding ZEST core (1Q1 or 1R1).

The ZEST-to-ZINC egress path (149b) follows essentially the same set of operations in the reverse direction. In ZEST chip 15Q, an eight-to-ten bit encoder 1Q2 converts egressing ZCell signals into the ten bit domain before forwarding them to a third, optional but preferable SERDES chip 1Q5. The serialized signals are then passed through one or both of electrical backplane 103a and optical interface 103b for receipt by the optional but preferable SERDES chip (e.g., 1K5) of a dynamically-identified or statically-preidentified, destination line card. Within the corresponding ZINC chip (e.g., 1K9), the converted-to-parallel signals are transformed from the ten bit domain to the eight bits-per-byte domain by a decoder such as 1K3. From there they are forwarded to the ZINC core 1K1 for further processing.

In one embodiment, the local clock rate of each ZINC and that of each ZEST chip is about 125 MHz. Each SERDES chip outputs a 1.25 Gbps stream per direction per port (125 Mbps×10 bpcp=1,250 Megabits per second). The ZINC and ZEST chips each maintain their own internal, core timing structures. These internal timing structures are referred to herein respectively as a 'ZINC tick' and a 'ZEST tick' The ZINC and ZEST chips also latch on (e.g., via PLL's or the like), within their peripheries, to the apparent clocks of signals coming in from the interface layer 103.

In the same one embodiment, the chip local 'ticks' each spans an average time period of approximately 80 edges of the local core clock. The span of one tick's worth of 80 or so clock edges can vary from one locality to another because the core and peripheral clocks of various ZINC and/or ZEST chips can be operating at different frequencies due to a variety of factors including local temperature, power supply voltages, IC fabrication effects, and so forth. Aside from those that develop due to differences in tick lengths (tick deltas), other skews may develop between the starts or stops of respective ZINC and ZEST chips because of different signal propagation times through different pathways in the interface layer 103. Such pathway induced skews between the ZINC ticks and the ZEST ticks may be corrected for in ZEST chips by use of buffering and a below described time-stamp aligning scheme (see FIGS. 3A–4). Skews between corresponding ZINC and ZEST ticks may also be corrected for in ZINC chips or the like by use of buffering and a below described snake-sort scheme (see FIG. 4) Duration differences between average length of ZINC and ZEST ticks (tick deltas) may be corrected for by use of an idle-bites insertion scheme as is described below (see FIG. 4). It may take several ticks (e.g., 6–8 ticks), as measured in the ZINC time frame, for a given ingress payload to make its way successfully from a given source line card to an indicated destination line card.

A variety of scalable solutions may be implemented using different parts and/or aspects of FIG. 1C. In one example, each of plural shelves (not shown, see 70, 80 of FIG. 1A) contains electrical backplane 103a. Optical interface 103b is provided as an additional interface card plugged into the backplane 103a. ZINC and ZEST chips such as 1J9 and 15Q are provided on respective line and switch cards that are also plugged into the backplane 103a. ZCells travel from one such shelf to a next as needed by passing through optical interface section 103b and inter-shelf optical fiber cables 103c provided between the shelves. Such a system may be expanded by adding more such shelves and cross linking them with optical fiber cables 103c or equivalent optical signal conveying means as may be appropriate.

In a second solution example, one set of shelves contain only line cards with respective ZINC chips such as 1K9 while another set of shelves each contains only switch cards with respective ZEST chips such as 15R. Communication between the ZINCs-only shelves and the ZESTs-only shelves may be carried out through optical-to-electrical interfaces such as 103f, 103d and through serial optical cables such as 103g. In this second solution example, the capabilities of each ZINCs-only shelf may be expanded incrementally by filling the shelf with more line cards (110–1N'0) as telecom service expansion proceeds until a maximum number, N' of line cards for the shelf is reached. The throughput capabilities of each ZESTs-only shelf may be expanded incrementally by adding more switch cards (74) as telecom service expansion proceeds until a maximum number of switch cards for the shelf is reached. Adding line cards increases the number of individual link lines (71) that may be serviced. Adding switch cards increases the number of ZEST chips and thereby increase the maximum traffic throughput rate of the switch fabric as will be better understood from the below discussion of FIG. 2.

As a third solution example that is available using parts of system 100' in FIG. 1C, one may have an initial system comprised of backplane 103a and in-shelf cards with ZINC and ZEST chips such as 1J9 and 15Q. In order to increase the number of ZEST chips that service the in-shelf ZINC chips 1J9, optical interface 103b may be added to electrical backplane 103a (or in an add-in card inserted into the backplane) while a supplementing shelf of switch cards with ZEST chips is provided and includes optical interface 103d as well as SERDES chips 1R5 and additional ZEST chips 15R. Optical cables 103c couple the first combined ZINCs and ZESTs shelf to the newly-added, ZESTs-only shelf (15R). Although the present discussion refers to optical fiber cables for items such 103c 103e and 103g, other forms of optical signal conveyance means may be substituted or added such as optical wave guides and/or mirrored systems for transmitting optical signals between shelves or inside shelves.

Returning to FIG. 1B, another feature of the illustrated system 100 is that of multiservice traffic handling. Link line 111 may support ATM ingress traffic such as is illustrated by the time versus packet-size graph shown at 115. The ATM ingress traffic 115 may be composed of 52-byte packets with 48-byte payloads embedded therein and with variable temporal displacements between the ingressing packets, A, B, C, etc. One of the ATM traffic flows coming in on link line 111 may be designated programmably for egress from line card 3 onto link line 131. As illustrated by the time versus data-size graph at 145, link line 131 carries TDM traffic instead of ATM traffic. When it ultimately goes out as TDM traffic 145 on link line 131, the payload data of a given source flow (say that of packets A, B, C of line 111) may be distributed as one-byte characters precisely positioned at fixed time slots such as $t'_0$, $t'_2$, $t'_4$, etc., with a fixed periodicity between these one-byte characters, A1, A2, A3, etc. It is understood here that bytes A1, A2, A3, etc. are eight-bit characters obtained from the 48-byte payload of packet A of ingress flow 115. Other bytes of other flows could be interposed between the periodic time slots of bytes A1, A2, A3, etc. Byte C48 in TDM traffic 145 may be a last payload byte obtained from ATM packet C of ingress traffic 115. It is the responsibility of the illustrated switching system 100 to make sure that appropriate parts of the ingress payload traffic 115 (A, B, C, etc.) fill appropriate time slots of the egress TDM traffic 145 while remaining within jitter and other synchronization constraints of the outgoing TDM traffic on line 131.

For a given traffic ingress such as 115 on line 111, the corresponding egress traffic need not be of the TDM type only such as shown for link line 131. Different parts of ingress traffic 115 may egress as like ATM traffic and/or as IP traffic (line 121) and/or as other protocol traffic (line 1N1) on a unicast or multicast basis. The specific one or more egress paths of a given ingress flow may be programmably pre-designated before the traffic flow begins. In-band-control (IBC) signals may be embedded in ZCells (see 511 of FIG. 5A) for pre-establishing special switching configurations or passing test and verification data between the line card and switch card layers. IBC signals that are sourced from the line cards may be responded to by programmable configuration-setting means and/or in-circuit testing means and/or status-reporting means provided within the ZEST chips 151–15m. One such line layer to switch layer IBC message might tell ZEST chips that a particular line card appears to be going bad and should not be listened to until otherwise commanded. Another such line layer to switch layer IBC message might ask a given ZEST chip to return the contents of its control registers so that a remote tester can verify the correctness of such control settings. If desired, ZEST chips may be configured to send test and other requests via the IBC signals to the ZINC chips.

In addition to or as an alternative to use of IBC, each ZEST chip may have a configuration/testing interface that allows an on-card processor means such as a switch-card CPU or the like (not shown) to supply configuration setting commands and/or test commands to the ZEST chips. While the latter solution tends to consume more of the scarce, board real estate in the switching layer 105 than does the in-band command and response approach, the latter solution has the advantage of providing a faster, control communications subsystem.

If the egress path(s) of a given ingress flow 115 include an egress from an IP link line such as 121 but not an egress from a TDM link line such as 131, then it can be appreciated that the egress timing constraints for the IP egress traffic (121) will often be less severe than the timing requirements for egress through a TDM link line (131). Egress payloads (140p) that need to make it on time to a fixed appointment time-spot (e.g., $t'_4$ for A3) should be given throughput precedence over egress payloads (e.g., IP egressors) which have a more flexible and looser needs for egress within a given time window. It is possible to optimize switching system 100 so that it makes efficient use of its switching resources in view of the more stringent and less stringent requirements of different kinds of egress traffic. Methods by which this may be carried out will now be described.

FIG. 2 is a conceptual diagram for explaining how multiple ZEST chips (151–15m) may be used to switch traffic at variable throughput rates. The illustrated system 200 is assumed to be very simple and comprised of just two fully populated switching matrices 251 and 252 (e.g., two ZEST chips). Switching matrices 251 and 252 are also referred to herein as first and second switching slices. In this simplified example, each of the switching slices has 16 horizontally-extending ingress lines crossing with 16 vertically-extending egress lines, where a programmably activatable switching point such as 255 is provided at every intersection of the lines. Activation of a switching point such as 255 allows an ingressing signal on the corresponding horizontal line to egress along the corresponding vertical line. If the switching point (255) is deactivated, a conductive path is not formed between the intersecting horizontal and vertical lines at the position of that switching point.

Those skilled in the art will appreciate that the illustrated, and fully populated 16-by-16 matrix 251 of switching points (one of which is denoted as 255) is not the most practical way to implement a switching matrix; particularly as one scales to larger sized matrices such as 32-by-32, 64-by-64, or higher. Each switching point (255) capacitively 'loads' its respective horizontal and vertical connection lines. The total amount of loading on each line becomes excessive as one scales the conceptually-illustrated version to larger sizes. In more practical implementations, rather than the one-shot switching organization shown in FIG. 2, it is better to have cascaded stages of switching that operate in pipelined fashion such that the pipeline stages each make use of the 80 or so clock edges that occur within a 'tick' so as to keep data constantly moving through the pipelined switching system. There are many different designs for implementing practical, fully-populated, switching matrices or crossbars, including pipelined and cascaded approaches. Such is beyond the purview of the present invention. The simple, one-shot switching organization shown in FIG. 2 is the easiest way to explain the concepts behind the invention. Hence it is used for convenience's sake.

The term 'ingress channel' will be used herein to refer to what is conceptually-shown in FIG. 2 as a horizontally-extending ingress line in combination with its set of on-line switch points (255).

For purposes of unicast traffic routing, when a given switch point (e.g., 255) is activated, it's horizontal ingress channel and vertical egress line may be deemed to be 'consumed' and thus unable to at that same time support unicast routing of other signals. The term 'crossbar' will be used herein to refer to a horizontally-extending ingress channel in combination with one of the vertically-extending egress lines. A notation such as 251.3x8 will refer herein to a crossbar defined in switch matrix 251 by ingress channel 3 and egress line 8. A notation such as 251.3 will refer herein to ingress channel 3 of switch matrix 251.

Each of horizontal ingress channels H1–H16 may receive egress traffic from a respective one of 16 line cards in our simple example. We assume that line card number 3 (230) contains an ingress queue 235 holding five cells that want to be passed through the switch fabric and over to destination line card number 8 (280) at a pre-specified rate, say OC-24. We assume further that due to the utilized IC technology, the cells-per-second, throughput rate of a given switch slice crossbar is limited to a maximum value, say OC-12. One example of a switch slice crossbar is indicated by first shading at 251.3x8 to provide ingress via channel H3 and switched egress via line V8a. If the cells of ingress queue 235 are to move at the faster throughput rate of OC-24, then switching slice 251 will not by itself be able to support such a throughput rate. However, if the cells of source line card 230 are spatially split apart as indicated by paths 211–214 so that roughly half the ingress cells (235) move through switch slice crossbar 251.3x8 while the remainder move in parallel through switch slice crossbar 252.3x8, then the desired throughput rate can be realized. That is the basic concept behind using plural switch slices such as 251 and 252. But there are practical problems that need to be solved.

More specifically, suppose that at first time point $t_1$, ingress CELL-1 is applied by path 211 to ingress channel H3 of slice 251 (also denoted as 251.3). Suppose that a second time point, $t_2$ which is fairly close to or identical to first time point $t_1$, ingress CELL-2 is applied by path 212 to channel 252.3. The sequential order and closeness of time points $t_1$ and $t_2$ can vary from one implementation to the next and even during use of a given implementation. This can be so for several reasons. It may be that ingress CELL-2 departs from line card 230 before ingress CELL-1, or vice versa. The signal propagation delay of path 212 may be longer than that of path 211, or vice versa. Ingress CELL-2 may develop an uncorrectable bit error during its travel across path 212 (e.g., across the line-to-switch interface layer 103' of FIG. 1C) and may therefore have to be re-transmitted at a later time over same path 212. These are just examples. Other factors that may cause variations of arrival time at a given horizontal ingress channel, 25J.K may include temperature changes, IC fabrication process changes, clock skew, and so forth.

As CELL-1 and CELL-2 respectively arrive on the H3 lines (or their equivalents) of switch slices 251 and 252, the respective switching points of cross bars 251.3x8 and 252.3x8 should have been pre-activated so that, upon successful arrival, CELL-1 and CELL-2 can quickly traverse out from respective egress lines V8a and V8b (or their equivalents) for respective coupling along paths 221 and 222 to destination line card 280. However, as was the case with the ingress paths 211–212, the now egressing cells can encounter same kinds of delays problems on respective paths 221–222 before CELL-1 finally arrives in egress queue 285 at respective time point $t_5$, and CELL-2 finally arrives in queue 285 at respective time point $t_8$. Because of the possible variations in positionings of destination line card 280 relative to switch slices 251, 252 and relative to source line card 230, and/or because of variations in signal propagation delays of paths 221–224, and/or because of other factors, the arrival times of egress cells such as CELL-1 through CELL-5 at queue 285 can vary in terms of sequence and closeness to one another. One problem is therefore how to compensate for such timing variations.

Another problem is how to make efficient use of the ingress and egress resources of the switch slices 251, 252. For example, if egress line V8b (or its equivalent) is busy servicing a horizontal ingress channel other than 252.3, then CELLs-2 and 4 may not be able to get through at that time. However that should not mean that all other egress possibilities from channel 252.3 should be wasted at that time. It may be that egress line V12b is not busy and it can service another cell wanting to travel from line card 3 to line card 12 by way of crossbar 252.3x12. So even if access requests by ingress CELLs-2 or 4 for switch slice crossbar 252.3x8 may be refused because V8b is 'busy', a 'secondary' request by another cell to use switch slice crossbar 252.3x12 (egresses through V12b') may be granted if egress line V12b' is not busy at the time of request arbitration. The primary requests that lost because of the V8b 'busy' problem may be queued up in a buffer within switch slice 252 for a pre-defined time length (e.g., up to about 6 ZEST ticks) and allowed to compete in future request arbitrations of ingress channel 252.3. If they age too much (e.g., more than roughly 6 ZEST ticks), the losing requests are dropped from the arbitration queue. More about secondary requests and queue aging when we discuss FIG. 5B. In addition to secondary egress of a unicast ZCell from egress line V12b', it is possible to multicast plural copies of ZCell's simultaneously from one ingress channel such as 252.3 for egress by way of plural vertical lines such as V8b and V12b' to respective destination line cards.

Figure 3A:
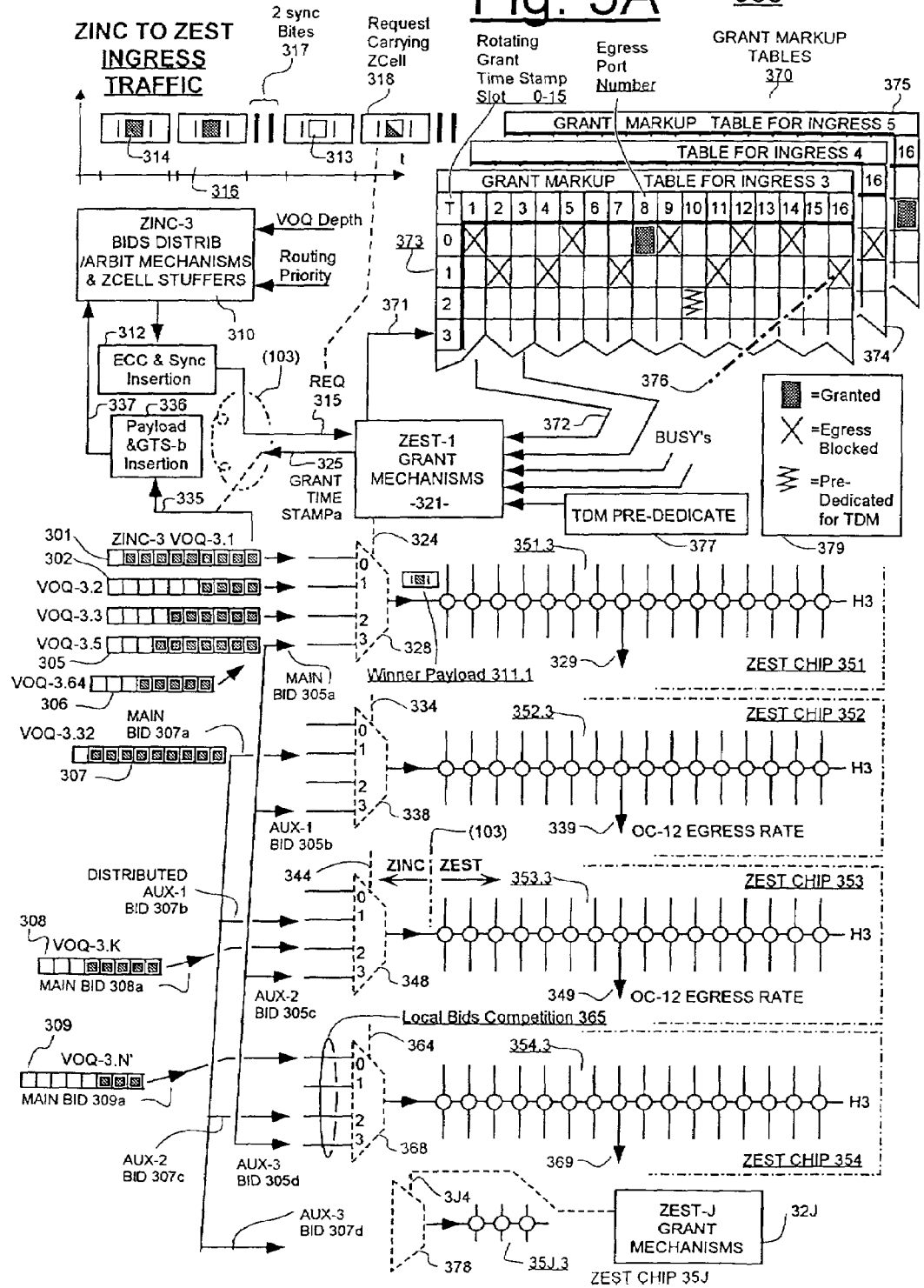
FIG. 3A is a conceptual diagram showing how traffic ingressing from a ZINC chip to a ZEST chip may be managed within one embodiment in accordance with the invention.

FIG. 3A is a conceptual diagram showing how ingress traffic from a ZINC chip to a ZEST chip may be managed within one embodiment 300 in accordance with the invention. Each ZINC chip contains a number, N, of destination-dedicated, Virtual Output Queues (VOQ's) plus, optionally, some additional undedicated VOQ's. There is one VOQ dedicated for each possible destination line (111–1N1 of FIG. 1B). In one embodiment, N equals at least 32 or 64. In the same embodiment, an additional two, undedicated VOQ's (not explicitly shown) are provided for storing multicast payloads.

The example illustrated in FIG. 3A shows that ZINC chip number 3 has a respective set of VOQ's including specific ones identified as 3.1, 3.2, 3.3, 3.5, 3.64, 3.32, . . . , 3.N'. These in-ZINC VOQ's are filled to one extent or another with payloads (P) and accompanying overhead data (OH—see FIG. 3B) of messages that are requesting to egress respectively to destination line cards 1, 2, 3, 5, 64, 32 and N'. (Note from the example of VOQ-3.3 that a given source line card can also serve as its own destination line card.) In one embodiment, each ZINC chip has N'=66 VOQ's of which 64 are dedicated to respective ones of 64 destination line cards and the other two may be used to support multicasting. Besides the illustrated VOQ's, others of the destination-dedicated and undedicated VOQ's of ZINC-3 may also be filled to various depths of capacity with respective payloads and/or overhead bits. These other VOQ's are not shown within FIG. 3A in order to avoid illustrative clutter.

All of the partially or fully-filled VOQ's of ZINC-3 may be considered as competing with one another for access to the respective ingress channels, 351.3 through 35J.3 (where J=2, 3, . . . , m) of the present and operable ZEST chips in the system (e.g., ZEST chips 351, 352, 353 354, through 35J). The illustrated ingress channels, 351.3 through 35J.3 of this example are assumed to be dedicated to servicing only ZINC-3. It is possible to have alternate configurations in which one or more ingress channels, 35J.1 through 35J.K (where K=2, 3, etc.) of a given one or more ZEST chips, J, are each assigned to service, on a time multiplexed basis or code-multiplexed basis, a pre-specified subset of the system's line cards rather than servicing just one line card. In the latter case, there may be more than one layer of switches in the switch fabric for routing payloads to their final destinations.

Plural ones of the VOQ's such as the illustrated VOQ's 301–309 (also identified as VOQ-3.1 through VOQ-3.N') of the ZINC-3 chip can compete with one another for getting their respective payloads moved through available ingress channels, $35i.3$ (where i=1, 2, . . . , m) in the given set of m ZEST chips. The more ingress channels a given VOQ wins, the faster that VOQ can send its payload bits through the switch fabric. If a given VOQ fails to win any of ingress channels, 351.3 through 35J.3 during a given competition round, it will not be able to move its payload bits through the switch fabric in a corresponding, payload transmission round, and the left-behind payload (P+OH) of that VOQ will in essence age. In subsequent bidding rounds, the ZINC chip may give its longer-waiting payloads (P+OH) higher priority values than newly-queued payloads to thereby improve the likelihood that the longer-waiting payloads will win in at least some of the local bidding wars. The ZINC chip may further automatically raise the priority values of its more-filled VOQ's (e.g., when the fill level of those VOQ's exceeds a predefined threshold) so as to inhibit queue overflow.

Beyond this, the ZINC chip should include a VOQ, age tracking mechanism that keeps track of the aging of VOQ payloads so that a VOQ payload does not inadvertently get left behind because, even though a request (315—to be described shortly) was sent out for it, a corresponding grant (325—also to be described shortly) for that payload somehow got lost and did not arrive at the corresponding ZINC chip or the request never won a grant in its targeted ZEST chip and it timed-out and got de-queued in that ZEST chip. If a given VOQ payload does not a grant within a user-programmed or otherwise pre-specified time limit, say of more than about 12–14 ZINC ticks, the respective ZINC chip can decide that the grant is not coming and that the ZINC chip needs to send out a new request. However, we are getting ahead of ourselves here because we have not yet described the process of winning a right to send out a request There are generally more VOQ's trying to send out requests at a given time than there are slots for carrying those requests. So the VOQ's need to compete with one another to determine which will get its request out first.

Although the competition amongst VOQ's of a given ZINC chip is resolved at least partially within that ZINC chip, for purposes of introduction and conceptual understanding of how the competition works, a first arbitrating multiplexer 328 is shown in dashed (phantom) form in FIG. 3A as if the multiplexer 328 were inside the ZEST chip (351) and as if it were directly feeding first ingress channel 351.3. Ingress channel 351.3 is in ZEST chip 351. Similarly, second through fifth arbitrating multiplexers 338, 348, 368, 378 are shown in dashed (phantom) form in FIG. 3A as if those multiplexers 328–378 were respectively each directly feeding a respective one of second through fifth ingress channels 352.3–35J.3 of respective ZEST chips 352–35J. As we explain the concepts in more detail below, it will be seen that a first arbitration (bidding war) occurs within each ZINC chip for deciding which of competing payloads get their requests out of the ZINC chip and successfully across the interface layer (103) just so the request can participate in yet a further arbitration in a targeted ZEST chip. The further arbitration in the targeted ZEST chip determines which request wins a grant for use of a particular ingress channel (e.g., 351.3) during a particular switching time slot (e.g., T=0–15).

In the conceptual introduction provided by FIG. 3A, a first, in-ZEST grant mechanism 321 is shown to be conceptually coupled by way of dashed line 324 to dashed multiplexer 328. Grant mechanism 321 is understood to reside in ZEST chip 351, as does ingress channel 351.3. Other in-ZEST grant mechanisms 322 (not shown) through 32J (shown) are understood to reside in respective ZEST chips 352–35J. Respective ingress channels 352.3–35J.3 also reside in respective ZEST chips 352–35J. Although not all illustrated, these other in-ZEST grant mechanisms 322–32J may be conceptually viewed as connecting respectively to dashed multiplexers 338, 348, 368, . . . , 378 by way of selection control lines 334, 344, 364, . . . , 3J4. This conceptual introduction is provided to indicate that the in-ZEST grant mechanisms 321–32J somehow play a part in determining which of the in-ZINC, competing payloads of VOQ's 301–309 will win competitions between one another for passage through the switch fabric. The ultimately winning VOQ's ultimately succeed in having their oldest payloads (e.g., 311.1, see also FIG. 3B) being transmitted to vied-for, ingress channels 351.3 through 35J.3, and then in having their payload bits transmitted along the respective H3 lines for subsequent switching by activated switch points (255, FIG. 2) onto respectively desired egress lines such as 329, 339, 349, and 369.

In a practical implementation (as opposed to the conceptual introduction provided above), the competition between the in-ZINC payloads of VOQ's 301–309 occurs in stages, starting first in the ZINC chip of those competing payloads. Each of the older payloads in each VOQ submits a 'bid' for having its request submitted to a given ingress channel. If the bid wins an in-ZINC competition, the ZINC chip sends a corresponding 'request' (REQ 315) to the vied-for ingress channel (e.g., 351.3). If the sent request (315) wins an in-ZEST competition for egress along its desired egress line (e.g., 329), the ZEST chip sends a corresponding 'grant' (325) back to the request-submitting VOQ. The grant-receiving VOQ then sends (335) its oldest one or more payloads (depending on how many grants the VOQ wins from multiple ZEST chips) to the won ingress channel (e.g., 351.3) or channels for insertion of those one or more payloads (and/or accompanying overhead bits) through a desired crossbar (e.g., $351.3x8$) during a pre-scheduled, future time slot (a GTSa-designated slot, as will be detailed below).

In one embodiment, a bids distributing and arbitrating mechanism 310 is provided in each ZINC chip (e.g., ZINC chip 3) for deciding which in-ZINC payloads of which in-ZINC VOQ's will compete with each other in localized contests. One such localized contest is illustrated in FIG. 3A as local bids competition 365. The bids that are picked to compete in a local competition (365) compete in a given time slot (bids competition round) for the privilege of sending an access request signal (REQ 315) in a related time slot (request transmission round) to a fought-over ingress channel number $35i.3$ (i=1, 2, . . . , m) within ZEST chip number i.

If it is successful in crossing the interface layer (103), the transmitted access request signal (315) enters a second stage competition. In that second stage competition, the transmitted access request signal (315) competes with other, like-transmitted requests by asking the targeted, ingress channel number $35i.3$ for mastery during one of an upcoming set of grantable time slots (e.g., T=0–15) over the H3 line of that channel and for concurrent mastery over one or more egress lines (e.g., 329) of the ZEST chip that contains the fought-over ingress channel $35i.3$, If a request is granted, the targeted, ingress channel $35i.3$ will provide the requested access during a ZEST-designated time slot (payload switch-through round). A payload from the winning VOQ may then pass through the crossbar (e.g., 51.3x8) during the associated time slot (e.g., a 'ZEST tick').

In the embodiment where there are N'=64+2 VOQ's (corresponding to 64 line cards plus two multicast queues) and only m=16 or less ZEST chips, the in-ZINC bids distribution and arbitrating mechanism 310 sorts through the competing needs of the queued-up payloads in its respective N' VOQ's based on factors such as VOQ fill depth, transmission routing priorities and/or payload aging. Those queued-up payloads that are deemed by mechanism 310 to have the greatest need to get through as soon as possible are designated as 'main' or 'principal' bidders and their corresponding bids (e.g., 305*a*, 307*a*) are distributed for competition within different ones of m or fewer local competitions (328–378) associated with the limited number, of m or fewer ingress channels 351.3–35*m*.3 that may be respectively provided in the available number of the m or fewer ZEST chips. During the bidding round, the selected bidders each bid to send out a respective REQ signal (315) over the interface layer (103) to a fought over ZEST ingress channel. The request transmission occurs during a bidding-associated and corresponding, request transmission round. The bids distributing and arbitrating mechanism 310 decides which bids win in each local, in-ZINC competition.

In the illustrated example of FIG. 3A, a first, main bid 305*a* is shown to have been placed into the localized competition pool of conceptual multiplexer 328 on behalf of payload-1 of VOQ 305 while another main bid 307*a* is shown to have been placed into a different localized competition pool, namely that of conceptual multiplexer 338 on behalf of payload-1 of VOQ 307. Each in-ZINC, local competition (365) may be limited to allowing no more than a prespecified number of competing bids. Accordingly, a low priority payload, say that of VOQ 306, may be shut out from even entering the bidding wars due to the bids-distribution decisions made by the bids distributing and arbitrating mechanism 310.

FIG. 3A shows that yet another VOQ-3.K (308) has had its respective main bid 308*a* placed in the localized competition pool of conceptual multiplexer 348. A yet further VOQ (309) of ZINC-3 is shown to have had its respective main bid 309*a* placed in the localized competition pool 365 of conceptual multiplexer 368.

Main bids such as 305*a*, 307*a*, 308*a*, 309*a* are typically given priority in their localized bidding competitions over so-called, auxiliary bids. However, that alone does not guarantee that a main bid will win the local bidding war and that its corresponding request (315) will thereafter win a 'grant' (325) in a subsequent competition carried out in the targeted, ingress channel 35*i*.3. It is possible that the local bidding pool (365) includes another main bid with higher routing priorities and/or more-filled VOQ depths; and that the ZINC arbitration mechanism 310 will give superceding preference to that other bid because the other's payload more urgently needs servicing. It is alternatively possible for the vertical egress line (e.g., 329) desired by a given main bid (e.g., 305*a*) to be unavailable in a next time slot (ZEST tick) because the egress line is 'busy' during that slot servicing a payload traveling through from a different ZINC chip. (The ZEST grant scheduling mechanism 321 decides this as will be detailed below.)

In order to improve the chances that one of the bidders in a local bidding round 365 will ultimately be serviced by a crossbar 35*i*.3*xj*, the in-ZINC, bids distributing and arbitrating mechanism 310 may decide to pick a different VOQ as second place winner as well as a first VOQ as a first place winner. The first place winning bid will send a 'primary' request to the targeted ingress channel 35*i*.3 while the second place winning bid (from a different VOQ) will be allowed to simultaneously send a 'secondary' request. See FIG. 5B. Even if the secondary request arose from a non-main bid, the secondary VOQ associated with that secondary request may nonetheless win the ultimate contest of first getting its payload through the targeted ingress channel 35*i*.3 while the main bid (305*a*) of the primary VOQ may end up losing the immediate competition for a so-called 'grant' from the vied-for ingress channel 35*i*.3 of respective ZEST chip 35*i*; for example because its egress line (the one sought by the primary VOQ) is 'busy'. As will be seen, the losing request is held over in a Request Queue (RQ 411 of FIG. 4) for a predetermined number of ZEST ticks (e.g., no more than 6) and allowed to compete in future, in-ZEST competitions.

Given that bids do not always get out of their ZINC chip as a request, let alone win a grant, it may be desirable to increase the chances that certain messages do win a grant. In order to increase the chances that a given bid associated with a specific payload in a specific ZINC VOQ (e.g., 305) will succeed not only in getting a request out to, but also in getting a responsive 'grant' back from at least one, if not more of the m ZEST chips in the system, 'auxiliary' copies of the main bid 305*a* may be created and distributively placed into other ones of the local bidding pools. The auxiliary bids may be used to increase payload throughput rate for their VOQ. For example, AUX-1 bid 305*b* may be included in competition pool 338 while AUX-2 bid 305*c* is included in the competition pool of multiplexer 348 and AUX-3 bid 305*d* is included in the competition pool 365 of conceptual multiplexer 368. Similarly, VOQ 307 may have its respective auxiliary VOQ bids 307*b*, 307*c* and 307*d* distributively applied to the local competition pools of another subset of the conceptual multiplexers 338–378, where the applied-to subsets of conceptual multiplexers can partially or fully overlap. This distributive bid placing increases the probability that at least one of the bids from a given VOQ-3.*j*, if not more, will win one of the bidding wars, will get its 'request' out to a corresponding ingress channel 35*i*.3 and will further get a corresponding and responsive 'grant' back from at least one of the m ZEST chips. In one embodiment, when the main bid is made to a ZEST chip J, up to three auxiliary bids are distributively and respectively made to ZEST chips J+1, J+2 and J+3, where J+i wraps around to 1 if the preceding count hits m. It is of course within the contemplation of the invention to alternatively have a different number of auxiliary bids and/or to distributively spread those auxiliary bids in other fashions, such as J+i, J+2i, J+3i, etc., where i=2, 3, . . . m−1 and wraparound occurs when J+Ki exceeds m.

In one embodiment, the 'main' or primary requests (e.g., 305*a*) and their corresponding 'auxiliary' requests (e.g., 305*b*) are those of a same payload or set of adjacent payloads in one VOQ of a given ZINC chip. On the other hand, so-called 'secondary' requests (discussed below) of each request-carrying ZCell are those of a payload in a different VOQ from that of the 'primary' request, but both are, of course, from the same ZINC chip.

Contrary to what is implied by the conceptual multiplexers 328, 338, 348, etc., and the respective winner-picking actions of dashed lines 324, 334, 344, etc., in one embodiment each ZINC chip picks two winning bids out of each of its local competition pools (365) for submitting simultaneously as respective primary and secondary requests (315) to a respective one of the m ZEST chips (and more specifically to the corresponding ingress channel 35*i*.*j* of the respective switch matrix in each such ZEST chip). FIG. 5B shows one example of a data structure 514B for a request signal that may be used for such simultaneous submission of both a primary and secondary request.

Referring still to FIG. 3A, each time a ZCell is transmitted from one of the N ZINC chips of the system (see also FIGS. 1B–1C) to a respective one of the m ZEST chips, a primary and optional secondary request for switch slice time may be inserted in a section 514 (FIG. 5A) of the to-be-transmitted ZCell. Before the request-carrying ZCells (318) are actually serialized and transmitted across the line-to-switch interface 103 (see also FIGS. 1B–1C), the ZCells are transformed within the ZINC chip from an 8 bpc domain (8 bits per character) to a 10 bpc domain by an ECC and synchronization insertion mechanism 312. As indicated in the time versus data graph shown at 316, two synchronization 'bites' are inserted (where herein there are 10 bits per 'bite') after every pair of transformed ZCells. An example is shown at part 317 of graph 316. In one embodiment, the two synchronization bites are sequentially coded as the K28.5 and K28.1 characters in accordance with industry standard fiber channel specifications. The sync bites are recognized by industry standard SERDES chips and may be used for realigning clock and data signals. The so-transformed request-carrying ZCells (318) are then each transmitted by way of path 315 (and through interface layer 103) into a request-considering and slot-granting mechanism 32J of the targeted ZEST chip, number 35J (e.g., 351).

As it travels within the ZINC-to-ZEST ingress traffic path (149a in FIG. 1C), the payload-holding section of the request-carrying ZCell 318 may be either empty or full. The content of the payload-holding section has no direct relation to the ZCell-carried request. A symbol for an empty payload section (unshaded square) is shown at 313. A symbol for a filled payload section (shaded square) is shown at 314. The symbol for the payload-holding section of ZCell 318 is shown half-shaded and half unshaded to indicate the lack of direct relation between payload and request. They merely both use the ZCell signal 318 as a vehicle for traveling from a given ZINC chip to a targeted ZEST chip. If a valid payload is being simultaneously carried by ZCell 318, that carrying of a payload is in response to an earlier received grant.

At the downstream end of the ZINC-to-ZEST ingress traffic path, a targeted ZEST chip processes the ZCell-carried requests (315). Each request-receiving ZEST chip, 35i may contain in a local memory and logic portion thereof, a plurality of what may conceptually be seen as N, grant-markup tables; each for a respective one of its N, horizontal ingress channels 35i.1 through 35i.N. In one embodiment, the circuitry for the markup tables and their management is physically diffused throughout the ZEST chip.

By way of example, ZEST chip 351 can contain N respective grant-markup tables including the illustrated three tables, 373, 374 and 375. The first grant-markup table 373 is associated with ingress channel 351.3 The second grant-markup table 374 is associated with ingress channel 351.4 (not shown). The third grant-markup table 375 is associated with ingress channel 351.5 (not shown) of ZEST chip 351.

Each grant-markup table (e.g., 373) includes a plurality of N columns, each for keeping track of a respective one of the N vertical egress lines of its ZEST chip. The grant-markup table (373) also includes a plurality of rows for keeping track of access grants made in so-called grant time slots. In one embodiment, there is a conceptual, rotating drum of 16 grant time slots, where the slots are denoted as T=0 through T=15. After grant time slot T=15, the drum's count wraps around to grant time slot T=0.

When dealing with requests (315) for unicast transmissions, for each future time slot, T=n of table 373, the ZEST grant mechanism 321 of respective chip 351 may grant and thereby pre-schedule the use of one vertical egress line in response to a respective unicast request for such use if the same egress line has not been otherwise promised to another (e.g., higher priority) request for the same future time slot, T=n. If the ZEST grant mechanism 321 does grant the requested, future use of a specific egress line (also denoted as an egress 'port' in FIG. 3A), then the promised egress line is marked as 'busy' or blocked in all the remaining grant-markup tables of that ZEST chip 351 for that allocated and future time slot, T=n. By way of example, it is seen in markup table 375 that vertical egress line (port) 16 was granted (shaded rectangle in column 16) for time slot T=1 to a request coming in on horizontal ingress channel 351.5 (not shown). The same egress line V16 was marked as blocked or busy ('X') in tables 373 and 374 as well as others that are not shown for the same time slot T=1. Extension line 376 indicates that the busy indications (X's) are propagated through all the other grant markup tables of the remaining ingress channels. A legend is provided at 379 for indicating the markings used in the illustrated markup tables 373–375 to represent a granted time slot (shaded rectangle) or an egress blockage (X).

Referring to the row of time slot T=0 of markup table 373, and assuming for the moment that row 0, column 8 is unshaded rather than being filled in as shown, we can see that vertical egress lines V1, V5, V9, V12 and V14 have already been pre-marked as busy (X) when the request (315) came in for egress from vertical line V8. If an incoming request asked for one of these busy egress lines, it would be denied. In one embodiment, highest priority requests are serviced first and given first choices of non-busy egress lines while lower priority requests are serviced later and thus given second-hand pickings over whatever egress lines are still left over as not being marked 'busy'. Line V8 was not busy or blank at the time the grant mechanism 321 considered the new request 315 asking for egress through line V8. As a result of this and optionally other arbitration factors, and in this example, the grant mechanism 321 granted vertical line V8 for time slot T=0 to the incoming request 315. Row 0, column 8 of table 373 was then marked by mechanism 321 (via control path 371) as represented by the filled-in rectangle to indicate that in upcoming, switching slot T=0, the corresponding crossbar 351.3x8 is allocated for servicing a payload associated with the winning request 315. Although not shown, it is understood that the same egress line V8 will be marked by mechanism 321 as blocked or busy ('X') in markup tables 374 and 375 as well as others of the markup tables of ZEST chip 351 for the same time slot T=0 per the implications of extension line 376.

For a subsequent, switching time slot T=1, the grant mechanism 321 may grant, at the time of in-ZEST competition and to then not-yet resolved and still competing requests, any one of the still not busy vertical lines V1, V3, V5–6, V8–10 and V12–15. As seen, V2, V4, V7, V11 and V16 are already marked as busy, meaning some other requests have already won those egress lines. These busy signals are returned by paths 372 to the ZEST grant mechanism 321 for evaluation when a next-round of requests (315') are considered. In one embodiment, the ZEST chip 351 often queues up a number of old and new requests for competitive consideration before deciding to favor one request over the others for an upcoming, switching time slot such as T=1. (See Request Queue 411 of FIG. 4.) A pool of as many as 768 new requests (768=64 ingress ports per ZEST times 12 new requests on average per ZEST tick) plus unresolved old requests in the RQ (411) may be considered as candidates for grants at the start of each ZEST tick. In order to fairly allot grants to all requests, a grant scheduling algorithm is undertaken. This grant scheduling algorithm is too complicated to be detailed herein and is outside the purview of the present invention. Briefly, the pool of over 700 requests is broken up into subpools of fewer numbers of requests (e.g., 48 requests each) and each subpool competes in a first pipeline stage for supremacy over a subset of the egress lines (e.g., 4 of V-lines 329). After winners are declared in the first pipeline stage for each pairing of a subpool of requests with a subset of egress lines, the pairings are reordered in a second pipeline stage and the inhabitants of each subpool try to trump the old winner of the paired subset of the egress lines based on higher priority and/or other criteria. The reordered pairing and trump attempts continue through more pipeline stages until just before the end of the local ZEST chip tick. At this point the final winners of V-lines have been picked. Losing requests are left behind in the RQ (411) for competing in the next ZEST chip tick. Winners get grants (315) sent back to their respective VOQ's in the respective ZINC chips. As the next, local ZEST chip tick begins, the grant scheduling competition starts anew in the respective ZEST chip.

When a grant is given by the ZEST grant mechanism 321, details about the grant are stored in the grant markup table, where the stored details include an identification of the granted time slot and of the one or more switching points (255) that are to be activated when that granted time slot occurs in the ZEST chip. The identification of the one or more switching points is referred to herein as a 'Grant Label'. For an embodiment represented in FIG. 5D it is seen that a Grant Label 574 may include the number (VOQ#) of the Virtual Output Queue that is receiving the grant. Because the VOQ# corresponds to the egress line number during unicast switching, the VOQ# in essence identifies the switching point (255) on the ingress channel that is to be activated. For the case of multicast switching, the Grant Label (584, FIG. 5E) may point to a lookup table entry that identifies the switching points that are to be activated. Along with the storing of the grant information in the appropriate markup table, a copy of the grant information 325 (FIG. 3A, see also FIGS. 5D–5E) is sent back through interface layer 103 in a ZCell of ZEST-to-ZINC egress traffic (149b of FIG. 1C) back to the requesting ZINC chip. We will see in more detail how this may happen when we reach FIG. 4.

The returned grant 325 includes a first Grant Time Stamp (GTS-a). When returned, this GTS-a information is associated in the receiving ZINC chip (e.g., ZINC number 3) with a payload cell 335 of a corresponding VOQ (e.g., 301). A payload inserting mechanism 336 within the ZINC chip inserts the associated VOQ's payload 335 into a next-output ZCell together with a copy of or an otherwise associated code (GTS-b) derived from the returned grant time stamp, GTS-a (325). The payload and copied/derived GTS-b are then forwarded by path 337 to a ZCell's stuffing portion of mechanism 310. ECC and synchronization insertion mechanism 312 then transforms the payload-carrying ZCell, adds the ECC bites and sync bites, and forwards the same via path 315 and through interface layer 103 to the granting-ZEST chip 351. When the allocated, switching time slot, T=1 comes into effect in the granting-ZEST chip 351, the payload that is accompanied by time stamp copy GTS-b is switched through the pre-allocated crossbar, 351.3x8. The switched-through payload (P, plus accompanying overhead bits OH—see FIG. 3B) then heads towards its destination line card while carried in yet another ZCell. More on this when we discuss FIG. 4 below.

Figure 3B:
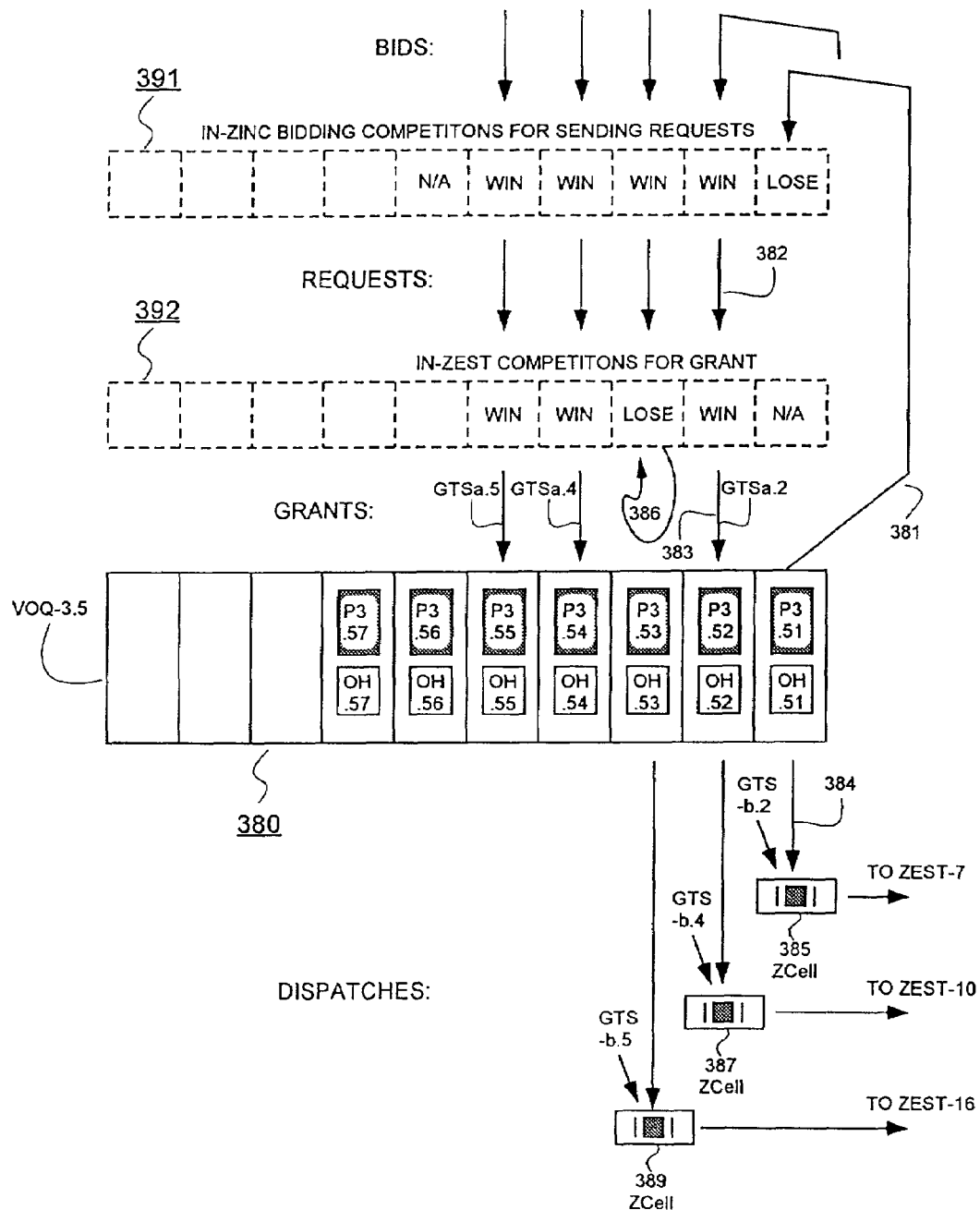
FIG. 3B is a conceptual diagram showing a VOQ anti-aging process that may be used within an embodiment according to FIG. 3A.

Referring FIG. 3B, an anti-aging aspect of the ZINC-side, payload dispatching mechanism is here described. The ZEST chips do not need to care about which specific payload is coming through during a pre-allocated, switching time slot. As long as the Grant Time Stamp (GTS-b) matches, that's all that should matter. On the other hand, the ZINC chips generally do care about which specific payload is going out in response to a won grant. It is desirable to have payloads of a VOQ go out in the same order they queued up in the VOQ. In VOQ 380 for example, payload P3.51 came in first with accompanying overhead data OH.51. Payload P3.52 came in second from the traffic manager chip (137 in FIG. 1B) with its accompanying overhead data OH.52 and so on. In one embodiment, the accompanying overhead data OH.5i includes control data such as: a Congestion Indicator bit (CI 527 of FIG. 5A), an End of Packet indicator bit (EOP 528), a Start of Packet indicator bit (SOP 529), a Flow Identification Number code (FIN 531), a Quality of Service indicating code (QOS 532), as well as other optional control data such as Rate Control Information (not shown in FIG. 5A, see instead RCI 638 in FIGS. 6A–6B).

Let us assume that the message in VOQ 380 has a relatively high priority and as a consequence, during a given bidding round, five main bids are simultaneously submitted to the in-ZINC, bids distributing and arbitrating mechanism 310 for payloads P3.51 through P3.55. Directional line 381 represents such a submission. Let us assume that in the concurrent bidding wars 391, payloads P3.52 through P3.55 win their respective, local competitions, while payload P3.51 has the misfortune of losing.

As a result of bid wars 391, requests such as 382 are sent to respective ZEST chips for participating in in-ZEST competitions 392 for corresponding grants. Let us assume that in the concurrent competitions 392, the requests associated with payloads P3.52, P3.54 and P3.55 win their respective, competitions in respective but different ZEST chips, while the request associated with payload P3.53 has the misfortune of losing. Even though it lost that current round of in-ZEST competitions, the request associated with payload P3.53 may be held over in a Request Queue (411) of its targeted ZEST chip and may be recycled for competing in a subsequent round. This is represented by recycling symbol 386.

As a result of request competitions 392, grants such as 383 are sent from the ZEST chips in which the requests were victorious to the corresponding VOQ 380, where the illustrated grants arise from the bids originally placed by payloads P3.52, P3.54 and P3.55 and thus carry respective Grant Time Stamps GTSa.2, GTSa.4 and GTSa.5. However, in accordance with one embodiment, the won grants of VOQ 380 are allocated to the oldest awaiting payloads and their respective overheads of VOQ 380 rather than to the specific payloads whose bids won the grants. So in the illustrated example, it is payloads P3.51–P3.53 and their respective overheads OH.51–OH.53 that are dispatched in the corresponding payload dispatch round by way of respective ZCells 385, 387 and 389. The payload accompanying Grant Time Stamps GTSb.2, GTSb.4 and GTSb.5 respectively correspond to the ZEST-supplied Grant Time Stamps GTSa.2, GTSa.4 and GTSa.5. In the illustrated example, ZCell 385 is dispatched to ZEST chip number 7, while ZCell 387 is simultaneously dispatched in the dispatch round (ZINC tick) to ZEST chip number 10, and while ZCell 389 is simultaneously dispatched in the dispatch round to ZEST chip number 16. As a result, VOQ 380 obtains a payload output rate of 3 during that dispatch round. Other in-ZINC VOQ's may have different payload output rates both in that specific dispatch round (ZINC tick), and on average as measured over a large number of dispatch rounds (e.g., 10 or more).

Referring FIG. 3A again, and particularly to time slot row T=2 of grant markup table 373, note that vertical egress line V10 has been pre-dedicated by ZEST grant mechanism 321 for a TDM transmission as indicated by the zigzag symbol in the legend 379. This means that when time slot T=2 comes up for switching of a payload in that ZEST chip, horizontal ingress channel 351.3 is automatically pre-dedicated by a periodically-dedicating subsystem 377 of ZEST grant mechanism 321, for servicing a TDM cell. There is no need to have a request arbitration in the ZEST chip to see if competing ATM or other types of traffic should more preferentially use the switching crossbar 351.3x10. The TDM payload automatically wins the competition if such a competition does take place. An allocation algorithm has been established in dedicating subsystem 377 for periodically claiming switching crossbar 351.3x10 at regularly spaced-apart, switching time slots (e.g., T=2, 6, 10, 14, 2, . . . ) even before other types of traffic have a chance to compete for mastery over the ingress channel 351.3 and/or the egress line V10 during those regularly spaced-apart, switching time slots. In this way, TDM traffic which needs access in pre-fixed time slots can be mixed together with other, more flexible kinds of traffic (e.g., ATM, IP) whose cell transmit times can be more flexibly and thus dynamically established. The losing, lower priority requests (e.g., ATM, IP) may be stored in the request queue (411) and allowed to compete in a later in-ZEST round.

In the illustrated example of markup table 373, the row for time slot T=3 is still empty and it has not been pre-dedicated for a TDM transmission. When new requests 315', 315", etc. (not individually shown) come in, are queued up, and ask for use of ingress channel 351.3, the ZEST chip grant mechanism 321 may decide based on egress priorities or other factors which of the latest requests that are competing for egress lines V1–V16 will get a grant for time slot T=3, and thereafter for T=4, T=5, T=7 (assuming T=6 is claimed by TDM traffic), and so forth. Appropriate entries in markup table 373 and in the other markup tables will then be made.

In a system having m=16 ZEST chips, each with a per-crossbar egress rate of OC-12, a given ZINC chip may push through its cells at an egress rate of OC-192 if it is granted all m=16 ZEST chips for use for its traffic. Alternatively, a given ZINC chip may acquire a throughput rate of OC-96 if it is granted one half of the m=16 ZEST chips. Similar and further combinations of throughput rates and granting ZEST chips are possible in accordance with this linear scheme.

Referring to FIG. 4, we now consider an embodiment 400 that handles ZEST-to-ZINC egress traffic. It is assumed here that an in-ZEST grant scheduling algorithm 321' has already injected, at a first time point, $t_{01}$ granting information 325' into a ZCell 425 that was dispatched back toward the requesting ZINC chip. When that grant-carrying ZCell 425 arrived at the requesting ZINC chip, the GTS-a information in ZCell 425 was copied or otherwise uniquely transformed, as indicated at 426, to define the GTS-b code in the payload section of a ZINC-to-ZEST ZCell and combined together with the winning payload and launched at second time point, $t_{02}$, back to the granting ZEST chip.

The payload-carrying ZCell that was launched at second time point, $t_{02}$, did not come into being in isolation. Referring momentarily to FIGS. 2 and 3B, it may be seen that multiple grants may be returning to a given ZINC chip (of card 230) in roughly the same time period from multiple ZEST chips (e.g., 251, 252) by way of return paths (135) of differing lengths/speeds. Referring momentarily to FIGS. 3A–3B, it may be seen that multiple grants may be returning for a same or differing VOQ's. The ZINC chip (230) will generally launch payload-carrying ZCell's in quick response to the arrival times of grants. But because the grant arrival times can vary due to the different-length/speed links 135, the ZINC chip (230) may not launch payload-carrying ZCell s back to every one of the associated ingress channels 351.3–35J.3 in the same order the ZEST chips sent out their grants. Also due to the different-length/speed links 135, the payloads may arrive at the differently located ZEST chips in orders other than exactly the way the grants went out. In other words, when the payloads are received in the grant-giving ZEST chips, the payloads may be out of alignment relative to the grants.

At locations 435a and 435b of FIG. 4, we show two payload-carrying ZCells that have arrived at different times at the ingress channel #3 input of a given ZEST chip 351 from respective VOQ's 3.J and 3.K of ZINC chip #3. Because there can be some variance in the exact order that given ZCells such as 435a or 435b arrive at the granting-ZEST chip from a respective VOQ 3.J or VOQ 3.K, the respective payloads and their GTS-b time stamps are first stored in an input-holding queue 436 that is also referred to here as the Alignment Queue (AQ). A local clock 439 within the ZEST chip determines when each crossbar-using time slot, T=n, (otherwise known as a ZEST tick) begins and ends. A GTS-b realignment algorithm 438 scans the alignment queue 436 and finds the payload that is associated with the next-effective and local T clock count (439) based on the GTS-b information carried with the corresponding payload. The switch point (455) of the requested vertical egress line is activated by way of path 440 as the granted time slot of the queued payload goes into effect. The grant markup table provides the association between the GTSb signal and the Grant Label. The corresponding payload (P of 435a or 435b) is then passed by way of path 441 from selection multiplexer 437 into the corresponding horizontal switch slice section 351.3 for egress from the vertical line 329 (or lines) designated by the Grant Label.

After the payload passes through its allocated crossbar (351.3xJ), the switched payload data is inserted by an in-ZEST insertion mechanism 412 into a ZCell package for return to the requesting ZINC chip. The in-ZEST insertion mechanism 412 further converts the egressing ZCell data into the ten-bit domain and adds an ECC field to the end of converted ZCell. Subsequent unit 415 inserts two ten-bit sync characters after every pair of egressing ZCells. Insertion unit 415 adds an additional idle bite 417 after every second pair of synch bites. This is seen in the time versus data graph provided at 416. In one embodiment, the two synchronization bites in the ZEST-to-ZINC traffic are coded as either one or both of the K28.5 and K28.1 characters in accordance with industry standard fiber channel specifications while the idle bite 417 is coded as the K28.0 character. The 4 ways in which the two sync bites can be coded (K28.1/K28.1; K28.1/K28.5; K28.5/K28.1; K28.5/K28.5) can be used to send 2-bit messages along the ZEST-to-ZINC traffic route. The periodic insertion of idle bites such as 417 causes the throughput rate (in terms of payload bits per second) of the ZEST-to-ZINC egress traffic 419b to be slightly less than the payload throughput rate of ZINC-to-ZEST ingress traffic (149*a* of FIG. 1C).

This intentional slowing down of the payload rate in the ZEST-to-ZINC egress traffic (419*b*) assures that the processing rates (run under ZEST clocks) of the switching chips will not race way ahead of the processing rates (run under ZINC clocks) of the line card chips. Half the problem of maintaining close synchronization between the line card processing rates and the switch chip processing rates is thereby obviated.

The other half of the problem is how to prevent the ZINC chip processing rates from racing ahead of ZEST chip processing rates as may happen if a ZINC chip clock is running slightly faster than the clock of a ZEST chip to which the ZINC is sending requests and payloads. A ZEST chip can detect the latter condition by sensing that an in-ZEST ingress buffer associated with a faster-running ZINC chip has become filled beyond an associated and predetermined threshold. In response, the condition-detecting ZEST chip (e.g., 351) begins asserting a back pressure bit (see 512 of FIG. 5A) in ZCell traffic 416 heading back to the too-speedy ZINC chip (e.g., 480). In response, the too-speedy ZINC chip stops sending requests and ingress payloads (318) to the complaining ZEST chip for a predefined reprieve period of say, 1 or 2 or more ticks. When the previously overwhelmed ZEST chip (e.g., 351) de-asserts the back pressure bit in the egress flow (149*b*), the ZINC chip returns to sending requests and ingress payloads at its normal rate. In this way, skew between the clock rates of the ZINC and ZEST chips is dynamically compensated for.

The intentionally slowed processing rates of the ZEST chips (due to insertion of the idle bites) also gives the receiving ZINC chips a slight amount of extra time to process all the payloads coming their way from the up-to-m ZEST chips of the system. If a given ZINC chip senses that its egress buffers are reaching an overflow threshold, possibly because multiple ZEST chips are all switching their egress traffic into the given, and overwhelmed ZINC chip, the ZINC chip may elect to send a back pressure bit, globally back to all or a fractional portion of the ZEST chips. In other words, if the given ZINC chip is facing a traffic overload in the egress direction, that ZINC chip cannot easily tell which of the payload-sourcing ZINC chips is responsible, and thus the overwhelmed destination ZINC cannot instruct a particular one or more source ZINC's to reduce their amount of sourced payload data in future source-ZINC—to—ZEST—to—destination-ZINC traffic flows (419*a*–419*b*). However, the overwhelmed ZINC chip at the destination end can begin to assert the back pressure bit (512, FIG. 5A) in ZCell traffic 316 heading back to all or a predefined fraction (e.g., half) of the ZEST chips. In response, the ZEST chips stop giving grants (325) to those requests (315) that are identifying the overwhelmed ZINC chip as their desired destination. When the overwhelmed ZINC chip drops its back pressure bit (in the to-ZEST direction), the ZEST chips resume giving grants (325) to those requests (315) that target the previously-overwhelmed ZINC chip.

As seen in FIG. 4, ZEST-to-ZINC traffic 419*b* moves through link 445 of the switch-to-line interface layer (103') and arrives at egress port E1 of ZINC chip 480. Egress port E1 services ZEST-to-ZINC traffic from ZEST chip 351. Egress ports E2–Em of ZINC chip 480 respectively service ZEST-to-ZINC traffic from respective ZEST chips 352–35*m*. For sake of brevity, FIG. 4 shows only the last of the series coming in by way of link 449 into egress port Em of ZINC chip 480.

Because the two sync bites of the ZEST-to-ZINC traffic 419*b* can come in four different organizations, and because errors in the interface layer 103 (e.g., within link 445) might cause either one or both of the sync bites to become corrupted while they move through the serialized transmission stream, a front-end egress-receiving portion of each port, E1–Em includes a so-called, forgiving state machine 481 that tries to synchronize the ZINC's local receive clock to the incoming sync bites, but is able to forgive and let the traffic through anyway even if one or both of the sync bites is on occasion missing. The forgiving state machine 481 waits for a next pair of sync bites, ordered according to one of the four possible organizations, and synchronizes itself to that next, fully-received pair.

The data that is received and synchronized-to by forgiving state machine 481 is next passed to converter unit 483. In converter unit 483, the 10 bpc ECC code is stripped off and used for error detection and/or error correction. The checked/corrected information of the ZCell is converted to the 8 bits per byte domain. A similar input through units alike to 481 and 483 occurs in parallel for each of egress ports E2–Em. Input path 491 is therefore to be understood as including its own counterparts of units 481 and 483 as will all the other input paths for the interposed other egress ports E2–E(m−1). In paths 484 through 491, the identification of the respective egress port, E1–Em is temporarily tagged onto the incoming data.

The synchronized and converted and tagged outputs of paths 484–491 are temporarily stored in a top portion or top layer 485*a* of a snaking shift register 485. In the embodiment where m=16, there will be 16 ZCell-storing sections in top portion 485*a*. The shift clock runs fast enough so that by the time the next salvo of ZCell's arrive from ports E1–Em, the earlier batch of m ZCell's will have shifted into second layer 485*b* of the snaking shift register 485. By the time the subsequent salvo of ZCell's arrive from ports E1–Em, the earliest batch of m ZCell s will generally have shifted into third layer 485*c*, and so forth.

A so-called, snake-sort may occur as the batches of ZCell's move downstream along the snaking shift register 485 towards lower layers 485*c* and 485*d*. Selective transposition units such as 486 are connected to the snake layers in the manner shown so that a spectrum of relatively wide and narrow-separation transpositions may be made in response to snake-sort algorithm 487. Algorithm control unit 487 can cause each of the transposition units 486 (only two shown, but more contemplated) to perform at least the following first test and follow-up action: IF in the ZCell's of the payloads currently passing-through the test ends of the transposition unit 486, the source identifications (e.g., field 526 in FIG. 5A) are the same, and if in the same ZCell's, the payload sequence number (e.g., field 525 in FIG. 5A) of the upper payload is less than the payload sequence number of the lower payload, then swap the ZCell's of the tested upper and lower layers (e.g., 485*a* and 485*d* respectively, or 485*b* and 485*c* respectively); ELSE, if there is no other basis for swapping, let the ZCell s pass through to the next stage of the snaking shift register 485 without swapping, and repeat the first test on the next arriving pair of ZCell's.

A second (lower priority) test and follow-up action of algorithm 487 may be constituted as follows: IF for the tagged ZCell s of the payloads currently passing-through the test ends of the transposition unit 486, the source identifications (e.g., 526) and the sequence number (e.g., 525) are the same, AND IF the tagged-on egress port number (E1–Em) of the upper payload is less than the egress port number of the lower payload, then swap the ZCell's of the tested upper and lower layers; ELSE, if there is no other basis for swapping, let the ZCell's pass through to the next stage of the snaking shift register 485 without swapping, and repeat the second test on the next arriving pair of ZCell's. This second test is useful because of the way payloads are dispatched to ZEST chips in FIG. 3B. The oldest payload (e.g., P3.51) is the one that normally should arrive at the destination line card before a later-sourced payload (e.g., P3.53). The oldest payload (e.g., P3.51) is also the one that is normally dispatched to a lower numbered ZEST chip (e.g., number 7 in FIG. 3B) while later-sourced payloads (e.g., P3.52–P3.53) are normally dispatched to respectively higher numbered ZEST chips (e.g., number 10 and 16 in FIG. 3B). Payloads P3.51–P3.53 may all be dispatched simultaneously with same a same source identification and source-end sequence number. At the destination end (485), if the source identification and source-end sequence numbers of tagged payloads are the same, they can be re-ordered according to the tagged-on egress port number (E1–Em) to thereby return them to their original, source-end order.

By the time the ZCell's of a given sourcing, line card have reached the exit 489 of the snaking shift register 485, those ZCell's should have sorted themselves into the order indicated by their respective payload sequence numbers (e.g., field 525) and/or their tagged on egress port numbers. (Of course it is within the contemplation of this disclosure to swap based on other swapping algorithms as may be appropriate in view of payload dispatching sequences used at the ingress side ZINC chips.)

Even though payloads of a given, sourcing, line card (e.g., card 1) may be properly sorted by algorithm 487, they may still belong to different 'flows' (see 14 of FIG. 1A) of communication. Typically, the flow identification number used at the destination will be different from the flow identification number used at the source. FIN lookup unit 493 includes a lookup table for converting the source FIN (e.g., field 531 of FIG. 5A) of each ZCell into a corresponding destination FIN. Unit 493 further includes FIN injecting means for replacing the source FIN's with the corresponding destination FIN's in passing-through ZCell's.

In a subsequent CSIX output unit 495 of the destination line card's ZINC chip 480, the contents of the outgoing ZCell's are repackaged into C-Frames 498 per the above-cited CSIX specification. The C-Frames 498 are then transmitted to the corresponding traffic manager chip (e.g., 137 of FIG. 1B) of the destination line card for further processing. In the subsequent protocol processor and F/M chips (e.g., 134 and 133 of FIG. 1B) of the destination line card, the data is conditioned for ultimate egress within the egress traffic stream (e.g., 145) of the destination line card.

Figure 5A:
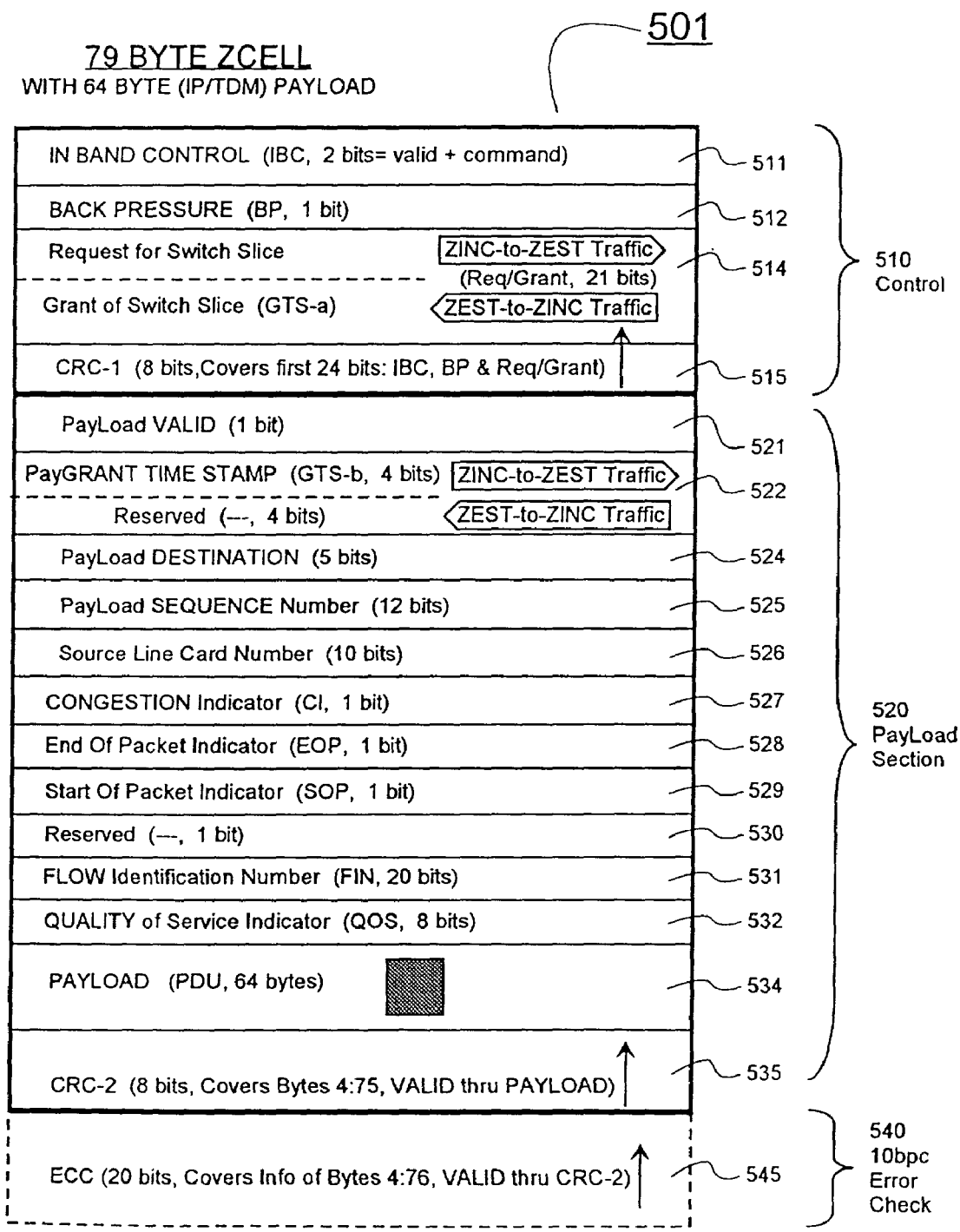
FIG. 5A shows a data structure of a first 79 word ZCell in accordance with the invention.
Figure 5B:
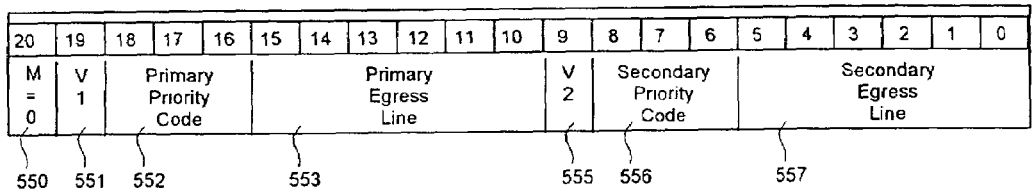
FIG. 5B shows the data structure of a 21 bit, unicast request field that may constitute field 514 of FIG. 5A.

Referring to FIG. 5A, we now study in detail a possible first data structure 501 for a ZCell signal that may be manufactured in accordance with the invention and transmitted as such in a corresponding one of ZINC-to-ZEST traffic path (316 of FIG. 3A or 149*a* of FIG. 1C) and ZEST-to-ZINC traffic path (416 of FIG. 4 or 149*b* of FIG. 1C) The illustrated ZCell 501 is a so-called, 79-byte ZCell (when considered in the 8 bpc domain, or a so-called 79-bite ZCell when considered in the 10 bpc domain) which ZCell has a 64-byte/bite payload-transporting region 534. It is possible to produce within a given switching system ZCell's with a differently defined size as is seen for example in FIGS. 6A–6B. Once chosen, the ZCell size should be fixed for that switching system so that state machine 481 (FIG. 4) does not have to waste time, and thus lose bandwidth, adjusting on-the-fly to different ZCell sizes.

The choice of size for the payload-carrying region 534 can significantly affect the efficiency of the given switching system. For example, if it is known that all the multiservice or uniservice line cards of the system will process only packets or cells of sizes equal to or smaller than 52 bytes, such as may occur with ATM or like traffic, then it would be unwise to use ZCell's such as 501 with 64-byte/bite payload-carrying regions 534. (The 64-byte/bite size may be chosen to be compatible with a 64 times whole number length of some commonly used IP packets such as the 44-byte IP acknowledge or the 576-byte X.25 message. The 64-byte size is a convenient power of two value that can contain the 44-byte IP acknowledge whereas a payload section with a 32-byte size would not be able to efficiently do so.) In the latter ATM-based case, it would be wiser to shrink the size of the payload-carrying region to 52 bytes so as to be compatible with the 52 bytes per cell format of ATM protocol. Every bit in the ZCell data structure consumes part of the finite bandwidth available in the line-to-switch interface layer 103/103' (see FIGS. 1B, 1C). It is desirable to use a predominant part of that finite bandwidth for passing-through payload data rather than merely overhead data. However, as already seen above, certain control overhead such as the back pressure indicator (512), the Grant Time Stamps (GTSa and GTSb), source card sequence number (525) and source card identification number (526) may be of valuable use for synchronizing transmissions between the line card layer 101 and the switch fabric layer 105 and for maintaining original payload order. Other control overhead such as the ECC field (545) may be of valuable use for assuring that transmissions between the line card layer 101 and the switch fabric layer 105 pass through an interface layer 103 without error.

Besides minimizing overhead, it is also desirable to transport source cells in whole within one ZCell or as roughly equal halves within 2 ZCells or in the form of roughly equal thirds within 3 ZCells, etc., rather than having picked a size for payload-carrying region 534 that causes most, but not entirely all (e.g., >75%), of a given source cell to fill up a first ZCell and then to have a small remainder (e.g., <25%) of the given source cell barely fill the second ZCell that transports its content, thereby wasting a good portion (e.g., >50%) of the second ZCell's payload-carrying capacity.

Accordingly, the payload-carrying region 534 of the ZCell should be sized to efficiently match the expected cell sizes of the line cards. Also, the ZCells should be organized to include, besides the system-matching payload region 534, generally, so much further overhead as may be essential for carrying out the various processes described herein.

More specifically, in the specific implementation of FIG. 5A, it is seen that ZCell structure 501 includes a 32-bits long (as measured in the 8 bpc domain), control section 510 which provides in a 21 bits-wide subsection 514 the overlapping, and thus bandwidth preserving, functions of carrying requests during travel of the ZCell in ZINC-to-ZEST traffic (149*a*) and of carrying grants during travel in ZEST-to-ZINC traffic (149*b*). This dual use of a same field 514 for traffic-direction specific functions means that bandwidth is not wasted carrying useless bits in one of the directions.

ZCell 501 further includes a payload section 520 which comprises not only the payload-carrying region 534, but also a directionally-dedicated, GTS-b field 522 for conveying the accompanying, copied Grant Time Stamp during travel in ZINC-to-ZEST traffic (149*a*). The GTS-b field 522 can be used to carry out the GTS-b alignment algorithm 438 of FIG. 4 when the ZCell 501 successfully reaches a targeted ZEST chip. The 4-bit field 522 does not currently have an assigned use in the ZEST-to-ZINC traffic direction (149b) and it is typically filled with 0's or another code for indicating it is blank but reserved for future expansion use when it is embedded in ZEST-to-ZINC traffic (149b).

Note that the contents of the payload section 520 are essentially independent of the contents of the control section 510. The contents of the control section 510 and of the payload section 520 happen to share the framework of a same ZCell 501 for moving across the line-to-switch interface layer 103. Note from graph 416 of FIG. 4 that such sharing of framework can include sharing of benefits from the synchronization of the input state machine 481 to the 2 sync bites that generally precede each pair of ZCells. (Note that the choice of number of sync bites and their coding is based on the type of interface layer 103 used. It is of course within the contemplation of this disclosure to use other numbers and/or repetition frequencies of sync bites and other codings as may be appropriate in view of the interface layer 103 used.)

Note further that the front end, control section 510 of ZCell 501 contains information that is less essential for immediately transporting payload data than is trailing section 520. The backend ECC section 545 does not consume additional error-check/correct resources for protecting the front end, control section 510. If a front end, state machine (e.g., 481) of a ZINC or ZEST chip fails to accurately synchronize with the first 4 bytes/bites (section 510) of an incoming ZCell but nonetheless manages to lock into accurate synchronization with trailing sections 520 and 540, then the more essential payload data 534 may be considered to have successfully crossed the line-to-switch interface layer 103 even if the contents of the first 4 bytes/bites (section 510) appear to have failed—either because a CRC-1 field 515 indicates the presence of error in control section 510 or because internal fields within a request/grant field 514 of section 510 do not comply with expected settings (e.g., valid=1). If CRC-1 field 515 indicates an error, then request/grant field 514 of control section 510 will be ignored by the ZCell-receiving chip. However, the back pressure field 512 will be conservatively assumed to be true (BP=1) and will be accepted as a valid assertion of back pressure. The ZCell-transmitting chip (more specifically the ZINC chip) should ultimately realize, after a predefined timeout has run (e.g., more than 12–14 ticks) or through other mechanisms, that its sending of the control section 510 was ignored, and the ZCell-transmitting chip may then elect to retransmit the contents of the failed control section 510.

Another included part of the payload section 520 is a 10 bits wide (as measured in the 8 bpc domain), sourcing line-card identification number (SLIN) field 526. SLIN field 526 is used for identifying the line card from which the current payload (534) ingressed into the switch fabric layer 105. Six bits of the SLIN field 526 may be used for resolving amongst 64 line cards. The remaining 4 bits may be used as an extension of FIN field 531 for resolving amongst larger numbers of flows or as an extension of field 526 for resolving amongst a larger number of line cards (e.g., 1024).

Yet another part of payload section 520 includes a payload sourcing sequence identification field 525 for identifying the order or sequence in which the accompanying payload 534 came in within the sourcing line card's ingress traffic (e.g., 115 of FIG. 1B). Fields 525 and 526 can be used to carry out the snake-sort algorithm 487 of FIG. 4 when the ZCell 501 successfully reaches a destination ZINC chip 480.

As already explained, FIN field 531 can be used as a lookup key for FIN Lookup function 493 of FIG. 4. Additional lookup key bits may be extracted from slack areas of the SLIN field 526.

Figure 7:
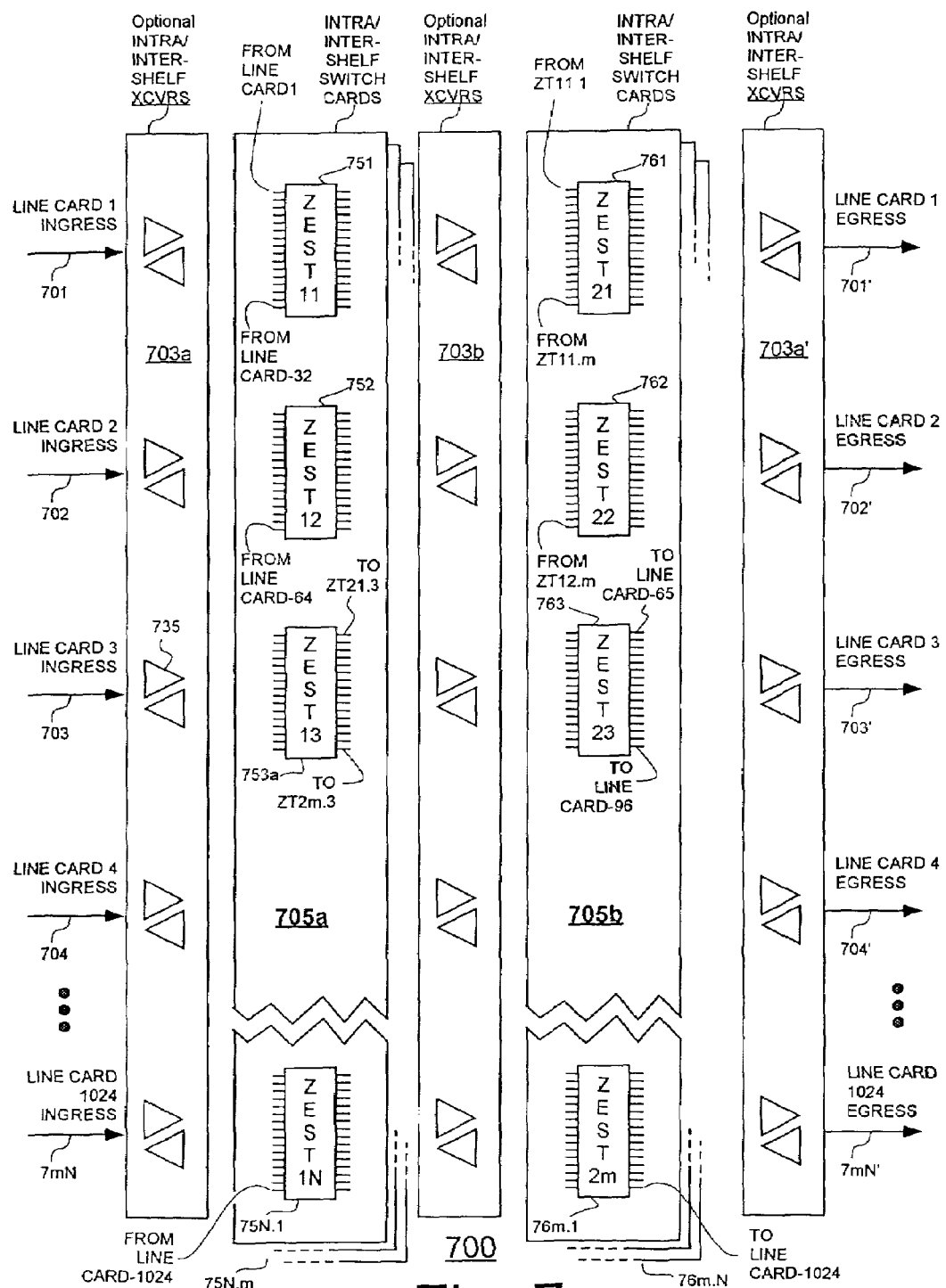
FIG. 7 is a block diagram of a multi-layered switch fabric.

Another field of the payload section 520 is a 5-bit, payload destination field 524 which may be used to define an extension of the destination port identification. Even though the 64 VOQ's of a ZINC chip may associate with a respective 64 destinations, those destinations can be second-layer ZEST chips rather than destination line cards. By way of a simplified example, assume each ZEST chip defines a 32×32 switching matrix instead of the 64×64 matrix described for system 100 (FIG. 1B). Assume further that there are two layers of such 32×32 ZEST chips instead of the single layer depicted in FIG. 2. In system 700 of FIG. 7 for example, 705a is a first, N×m array of ZEST chips while 705b is a second, m×N array of ZEST chips. The 32 egress lines of each first layer ZEST (e.g., 751) each connect to a respective 32×32 ZEST chip of the second layer 705b. The total number of egress lines out of the second layer 705b of 32×32 ZEST chips is therefore 1024. The additional 5-bits of destination field 524 in FIG. 5A may be used to identify with greater resolution (e.g., up to 32 times better), what route a given ZCell is following as it traverses through the two-layered maze of ZEST chips 751–75N.m and 761–76m.N. As seen in FIG. 7, the two-layered switch fabric may use intra/inter shelf links 703a,a' and 703b for providing the interconnections between the 1024 line cards and also between the switch fabric layers 705a, 705b.

Referring again to FIG. 5A, yet other fields of the payload section 520 may be used to signal to the destination line card if the carried payload data 534 constitutes a start of a data packet (SOP indicator bit 529) or an end of a data packet (EOP indicator bit 528).

The 8-bit quality of service field (QOS) 532 indicates to the Traffic Manager chip in the destination line card a current quality of service (bandwidth contract) that is to be supported for different kinds of cell types and routing requests based on threshold parameters that are pre-established in the Traffic Manager chips of the source line cards. Examples of QOS types for ATM traffic include: a best-effort contract, a constant bit rate contract and a variable bit rate contract. The Traffic Manager chips respond to the QOS field 532 by managing traffic so as to try to meet their contract obligations. Alternatively, or additionally, the QOS field 532 can indicate to the Traffic Manager chip in the destination line card, a particular discard preference.

The 1-bit congestion indicator field (CI) 527, if asserted (CI=1) indicates to more-downstream receiving devices (e.g., Traffic Manager chip in destination line card) that a congestion condition was detected upstream. The CI bit is either passed through as is or is set if a congestion condition is detected in the corresponding device that is carrying the CI bit. Typically it is the source line card's Traffic Manager (TM) chip or a further upstream device which sets the CI bit if buffers of the source TM chip or other upstream device are filling past threshold. The CI bit may also be asserted by a device on the destination side of the switch fabric.

The 8-bit, CRC-2 field 535 may be used to find presence of error in payload section 520. If CRC-2 field 535 indicates an error, then payload section 520 will be ignored by the ZCell-receiving chip. In addition to error protection by the CRC-2 field 535, additional error checking and correction functionality is provided by ECC field 545. ECC field 545 is tacked as a 2-bite (20 bits) entity during or after conversion from the 8 bpc domain to the 10 bpc domain and ECC field 545 is stripped off before or during conversion from the 10 bpc domain to the 8 bpc domain.

Referring to FIG. 5B, a first filling data structure 514B for region 514 of ZCell 501 is described. Filler 514B can be used within ZINC-to-ZEST traffic (149*a*) for transporting one or two requests (a primary and a secondary one) from a given ZINC chip (e.g., 310 of FIG. 3A) to a corresponding ingress channel (e.g., 321/351.3 of FIG. 3A) within a receiving ZEST chip. Within the 21-bit data structure 514B (as measured in the 8 bpc domain), most significant bit 20 defines a multicast flag 550 and that flag 550 is switched to zero (M=0) for the case of the illustrated, unicast request filler 514B. The next most significant bit, 19 defines a valid primary request flag 551 and that flag 551 is switched to true (V1=1) for the case where further fields 552 and 553 of the primary request contain valid data. If the primary valid flag is instead false (V1=0), then the primary request data fields, 552 and 553 are ignored by the ZEST grant mechanism (321) of the receiving ingress channel (351.3). In one embodiment, if V1=0, then the remainder of the unicast request filler 514B is deemed invalid. In other words, a secondary request (556–557) cannot be considered in that embodiment unless the secondary request is accompanied by a valid primary request (552–553) This is an optional, data-validating mechanism which assumes that the sending ZINC chip always distributes primary requests (552–553) into its ZINC-to-ZEST traffic transmissions before adding on secondary requests.

A 3-bit primary priority code in the range 0–7 fills the primary priority code field 552. Field 552 can be used by the ZEST grant mechanism (321) of the receiving ingress channel to determine which of competing requests that are asking for egress lines should win the grant. It is up to the traffic manager chip (117) to define an initial primary priority code for each VOQ. If the request-originating ZINC chip (119) fails to win grants and one or more of its VOQ's fills beyond threshold, the ZINC chip can let the Traffic Manager chip know. The Traffic Manager chip may then set a new, higher priority for the back-congested VOQ. In one embodiment, a turbo-boost part of CSIX compatible interface 118 is used for allowing the Traffic Manager chip to temporarily boost the priority code of a given VOQ and to thereby temporarily increase the likelihood that the ingressing message will win grants from one or more of the ZEST chips the message competes in.

The function of the 6-bit primary egress line field, 553 is basically given by its name. It identifies one of 64 possible destinations to which the later payload, if its request is granted, will be targeted.

The actual line card to which the later payload is routed may be different than that indicated merely by the 6-bit primary egress line field. It may be further resolved by the 5-bit, payload destination field 524 (FIG. 5A) as described above.

For the respective V2 validity flag, priority code and egress line identification fields, 555–557 that fill the remainder of the unicast request filler 514B as shown, the functions are essentially the same as those for the primary request and thus do not need to be reiterated. As already described, in one embodiment, if V1=0, then the secondary request is deemed invalid even if V2=1.

Figure 5C:
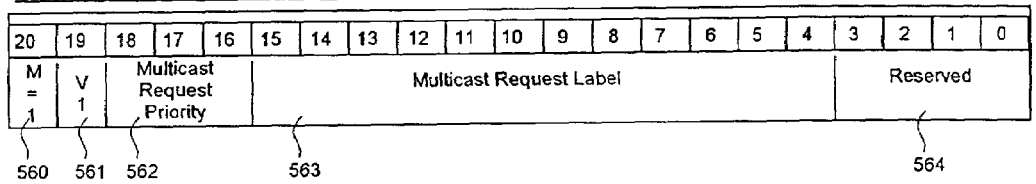
FIG. 5C shows the data structure of a 21 bit, multicast request field that may constitute field 514 of FIG. 5A.

Referring to FIG. 5C, a second filling data structure 514C for region 514 of ZCell 501 is described. Filler 514C can be used within ZINC-to-ZEST traffic (149*a*) for transporting a multicast request from a given ZINC chip (e.g., 310 of FIG. 3A) to a corresponding ingress channel (e.g., 321/351.3 of FIG. 3A) within a receiving ZEST chip. Within the 21-bit data structure 514C, most significant bit 20 again defines the multicast flag 560 and that flag 560 is switched to true (M=1) for the case of the illustrated, multicast request filler 514C. The next most significant bit, 19 defines the valid request flag 561 and that flag 561 is switched to true (V1=1) for the case where further fields 562 and 563 of the multicast request contain valid data. If the primary valid flag is instead false (V1=0), then request data fields, 562 and 563 are ignored by the ZEST grant mechanism (321) of the receiving ingress channel (351.3).

A 3-bit multicast priority code which has the value range, 0–7 fills the multicast priority code field 562. Field 562 can be used by the ZEST grant mechanism (321) of the receiving ingress channel to determine which of competing requests that are asking for egress lines should win the grant. It is up to the traffic manager chip (117) to define and optionally boost on a temporary basis, the multicast priority code for each VOQ. The turbo-boost part of CSIX compatible interface 118 may be used to optionally boost the priority code of given multicast VOQ on a temporary basis and to thereby increase the likelihood that the ingressing message will win grants from one or more of the ZEST chips the message competes in.

The function of the 12-bit, multicast label field 563 is to point to a specific entry within a lookup table (LUT, not shown) of the receiving ZEST chip, where that LUT entry then identifies the specific egress lines from which the multicast payload is to egress if its request is granted. The multicast label LUT may be programmed during system bootup or dynamically on the fly depending on system requirements. Initial configuration may be accomplished with bootup PROMS or the like which connect to the ZEST chips. Additionally or alternatively, the multicast label LUT may be programmed or patched by way of In-Band Control (IBC) sent from the line card layer 101 to the switch fabric layer 105 by way of IBC field 511 of the ZCells or by way of another control communications pathway. As shown in FIG. 5A, in one embodiment, the first two bits of a ZCell define a command-valid bit and a corresponding command bit. The command bit is considered valid by a receiving ZINC or ZEST chip if its accompanying command-valid bit is set true ('1'). Command bits may be serially transmitted from respective ZINC chips to respective ingress channels of the in-system ZEST chips by way of IBC fields 511. These may be used among other things for programming the multicast label LUT's as may be desired. The optional CPU interface on the ZEST chips may be used to configure the lookup tables and the like.

Bits 0–3 (field 564) of the second filling data structure 514C are reserved for future expansion use.

Figure 5D:
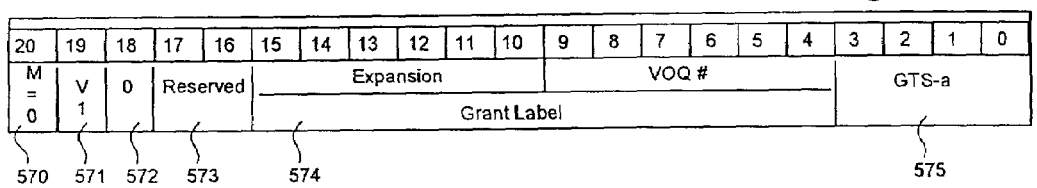
FIG. 5D shows the data structure of a 21 bit, non-TDM unicast grant field that may constitute field 514 of FIG. 5A.

Referring to FIG. 5D, a third filling data structure 514D for region 514 of ZCell 501 is described. Filler 514D can be used within ZEST-to-ZINC traffic (149*b*) for transporting a non-TDM unicast grant from a given ZEST chip (e.g., 321' of FIG. 4) for a corresponding ingress channel (e.g., 351.3 of FIG. 4) and to a receiving ZINC chip. Within the 21-bit data structure 514D, most significant bit 20 again defines the multicast flag 570 and that flag 570 is switched to false (M=0) for the case of the illustrated, unicast grant filler 514D. The next most significant bit, 19 defines the valid grant flag 571 and that flag 571 is switched to true (V1=1) for the case where trailing grant fields, 574–575 contain valid data.

Field 572 indicates TDM versus non-TDM traffic (see 592 of FIG. 5F) and it is set false (T=0) in the case of the non-TDM unicast grant filler 514D. The next most significant bits, 16–17 define a reserved field 573 which is reserved for future expansion use.

Bits 4–15 define a 12-bit grant label field 574 which identifies the VOQ for which the accompanying Grant Time Stamp (GTS-a, 575) is being sent. In one embodiment, the identification of the specific VOQ from which the unicast payload is to ingress into the switch fabric layer 105 is given directly by bits 4–9 while bits 10–15 are reserved for future expansion. In an alternate embodiment, the 12-bit grant label field 574 points to a specific entry within a lookup table (LUT, not shown) of the receiving ZINC chip, where that LUT entry then identifies the specific VOQ from which the unicast payload is to ingress into the switch fabric layer 105 given that its request is now being granted. The grant label LUT may be programmed during system bootup. This may be done with bootup PROMS or the like which connect to the ZINC chips. Additionally or alternatively, the grant label LUT may be programmed or patched by way of In-Band Control (IBC) sent from the switch fabric layer 105 to the line card layer 101 by way of IBC field 511 of the ZCells.

Bits 0–3 define the 4-bit Grant Time Stamp (GTS-a) field 575. As was already explained for FIG. 3A, the winning request is allocated a future one of soon upcoming time slots 0–15 on the rolling time drum of the grant markup tables 370. As was already explained for FIG. 4, when the winning VOQ receives GTS-a (575) from a ZCell launched at time point $t_{01}$, the VOQ copies (426) that GTS-a code into the GTS-b field (522) of a return ZCell and launches the return ZCell at time point $t_{02}$ back to the granting ingress channel. Re-align algorithm 438 then uses the GTS-b field (522) to accurately inject the accompanying payload (534) through the switch point (455) of the requested vertical egress line at the ZEST chip local time that corresponds to the GTS-b code.

Figure 5E:
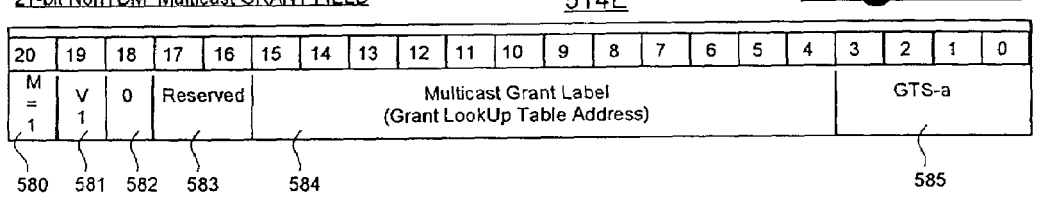
FIG. 5E shows the data structure of a 21 bit, non-TDM multicast grant field that may constitute field 514 of FIG. 5A.

Referring to FIG. 5E, a fourth filling data structure 514E for region 514 of ZCell 501 is described. Filler 514E can be used within ZEST-to-ZINC traffic (149b) for transporting a multicast grant from a given ZEST chip (e.g., 321' of FIG. 4) for plural egress from a corresponding ingress channel (e.g., 351.3 of FIG. 4), where the grant returns to a requesting ZINC chip. Within the 21-bit data structure 514E, most significant bit 20 again defines the multicast flag 580 and that flag 580 is switched to true (M=1) for the case of the illustrated, multicast grant filler 514E. The next most significant bit, 19 defines the valid grant flag 581 and that flag 581 is switched to true (V1=1) for the case where trailing grant fields, 584–585 contain valid data. As in the case of FIG. 5D, field 582 indicates TDM/non-TDM traffic and it is set false (T=0) in the case of the non-TDM multicast grant filler 514E. The next most significant bits, 16–17 again define a reserved field 583 which is reserved for future expansion use.

Bits 4–15 define a 12-bit grant label field 584 which identifies a multicast VOQ entry for which the accompanying Grant Time Stamp (GTS-a, 575) is being sent. In one embodiment, the 12-bit grant label field 584 points to a specific entry within a granted-VOQ lookup table (LUT, not shown) of the receiving ZINC chip, where that LUT entry then identifies the specific VOQ storage region from which the multicast payload is to ingress into the switch fabric layer 105 given that its request is now being granted. The grant label LUT may be programmed during system bootup. This may be done with bootup PROMS or the like which connect to the ZINC chips. Additionally or alternatively, the granted-VOQ labeling LUT may be programmed or patched by way of a CPU interface bus that may be provided in the ZINC chips.

Figure 5F:
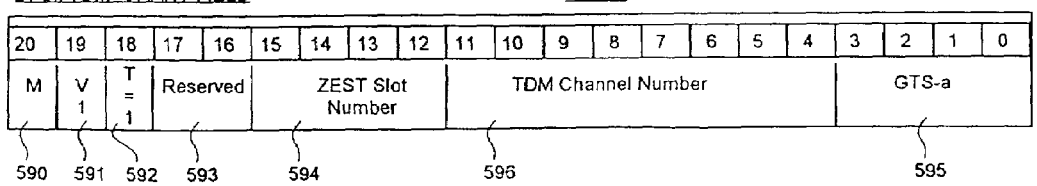
FIG. 5F shows the data structure of a 21 bit, TDM grant field that may constitute field 514 of FIG. 5A.

Referring to FIG. 5F, TDM-type ZINC-to-ZEST traffic is not preceded by individual requests for grants because the TDM, switch-through time slots are pre-dedicated on a periodic basis per the above description of FIG. 3A. Accordingly, a TDM request filler is not shown between FIGS. 5C and 5D. Nonetheless, grants such as the filler structure 514F illustrated in FIG. 5F are sent from the respective TDM-carrying ZEST chips to corresponding, TDM-carrying ZINC chips as part of the ZEST-to-ZINC traffic (149b) in order to induce the ZINC chips to timely forward their TDM-type payloads to the switch fabric layer 105.

As in the case of FIGS. 5D–5E, the fifth filling data structure 514F for region 514 of ZCell 501 is 21 bits long as measured in the 8 bpc domain. Most significant bit 20 again defines the multicast flag 590 and that flag 590 may switched to true (M=1) if the illustrated, TDM grant filler 514F is to grant egress through a plurality of pre-identified egress lines. More typically, multicast flag 590 will be switched to false (M=0) because the TDM-type traffic is typically of a unicast style.

The next most significant bit, 19 of filler 514F defines the valid grant flag 591 and that flag 591 is switched to true (V1=1) for the case where trailing grant fields, 594–596 contain valid data. Field 592 indicates TDM traffic is therefore set true (T=1). The next most significant bits, 16–17 again define a reserved field 593 which is reserved for future expansion use.

Bits 4–11 define an 8-bit wide, TDM channel number field 596. Typically, a TDM transmission frame can contain data from up to 192 different channels. Each ZCell 501 can carry up to 64 bytes of a given channel's data within its payload-carrying region 534. The data-sourcing line card can arrange its to-be-switched data so that sequential bytes of a specific channel are packed together for efficient transmission by a same ZCell. Then when the grant 514F for that specific channel comes in, as indicated by channel number field 596, the sourcing ZINC chip can insert (see unit 336 of FIG. 3A) the so-packed sequential bytes of the identified channel into a next ZCell which is ingressing (149a) into the switch fabric layer 105.

Not all TDM traffic needs to move through the switch fabric layer 105 at high throughput rates (e.g., OC-12 or higher). Some TDM traffic may be content to pass through the switch fabric layer 105 at a much slower rate, such as between T3 and OC-12. In one embodiment, each ZEST-grantable, switching time slot (e.g., T=0 through 15 of FIG. 3A) is associated with up to 12 multiplexing slots. If all 12 slots are allocated to a given TDM stream, then the stream is consuming the full bandwidth of that ZEST-grantable, switching time slot (T). On the other hand, if 6 of the slots are used by one TDM stream while an interspersed 6 others of the slots are used by a second TDM stream, then each stream will be sharing a respective half of the full bandwidth available from that ZEST-grantable, switching time slot (T). In accordance with one embodiment, the TDM pre-dedicating module 377 of each ingress channel is responsible for interspersing over time, a plurality of slot numbers which are associated with different TDM streams that happen to share the bandwidth of a given, ZEST-grantable, switching time slot (T) as provided by one or more ZEST chips. Field 594 (ZEST slot number) identifies the particular slot that is being serviced by the accompanying Grant Time Stamp of GTS-a field 595. It is up to the grant-receiving ZINC chip to insert the correct payload for each indicated ZEST slot number. As seen in FIG. 5F, the GTS-a field 595 is positioned across bits 0:3 as it also is in FIGS. 5D and 5E.

Referring again to FIG. 5A, some miscellaneous fields of ZCell structure 501 are now described. Back pressure field 512 is 1 bit wide and is used for inhibiting FIFO-like overflow in both the ZINC-to-ZEST traffic direction (149a) and the ZEST-to-ZINC traffic direction (149b). If the ZCell's receiving input queue (e.g., Alignment Queue 436) of a given ingress channel fills beyond a predefined, overfill threshold, the ZEST chip begins inserting true, back pressure bits (512) into the ZCell's (329) heading back from the overfilling ingress channel (e.g., 351.3) to the payload-sourcing ZINC chip (e.g., of line card 3). In response, the ZINC chip should temporarily stop sending requests to the overfilled ingress channel (e.g., 351.3). The overfilled Buffer is thereby given an opportunity to empty down below its overfill threshold level. Then the back pressure bits (512) flowing back to the payload-sourcing ZINC chip (e.g., of line card 3) may be reset to false and the so-informed, ZINC chip can be begin to send further requests to the previously over-loaded ingress channel. It should be noted that, although a given one ingress channel (e.g., 351.3) may be overfilled, that does not mean that other ingress channels (e.g., 352.3, 353.3, etc.) are also overfilled. Thus, when a payload-sourcing ZINC chip receives back pressure indications from one subset of ingress channels, the ZINC chip may respond by redistributing its bids (301–309) to ingress channels other than those in the one subset.

In one embodiment, egressing payloads pass through two buffers in the ZINC chip (e.g., 480 of FIG. 4) of the destination line card. One of those buffers (e.g., 485a) receives ZCell's from the switch fabric layer 105 while the other (inside CSIX output module 495) forwards payload data by way of CSIX compatible interface 138 to the corresponding traffic manager chip 137. Either one of these two buffers (485a/495) may fill beyond its predefined, and respective overfill threshold. The overfill indicator signals of these two buffers (485a/495) are logically ORred together and the OR result is inserted by the ZINC chip into the back pressure bits (512) of ZCell's (315) heading out from the overfilling ZINC chip to the payload-supplying ZEST chips. In response, the ZEST chips should temporarily mark the egress line of the overfilled ZEST chip as being 'busy' (X in markup tables 370). As a result of this, the respective ZEST chips will stop providing grants to requests that target the overfilled ZINC chip. The overfilled one or two buffers (485a/495) are thereby given an opportunity to empty down below their overfill threshold levels. Then the back pressure bits (512) flowing back to the payload-supplying ZEST chips may be reset to false and the so-informed, ZEST chips can then allow the previously 'busy' egress lines to become not busy and the so-informed, ZEST chips can thereafter begin to send grants back for requests targeting the previously over-loaded ZINC chip. It should be noted that, although a given one ZINC chip may be overfilled, that does not mean that other destination line cards are also overfilled. The ZEST chips (105) can continue to switch ZCell's onto the egress lines (e.g., 339, 349, etc.) associated with ZINC chips that are not so overfilled.

Field 530 is 1 bit wide and reserved for future use. It is included so that ZCell structure 501 will have an even number of bits.

Figure 6A:
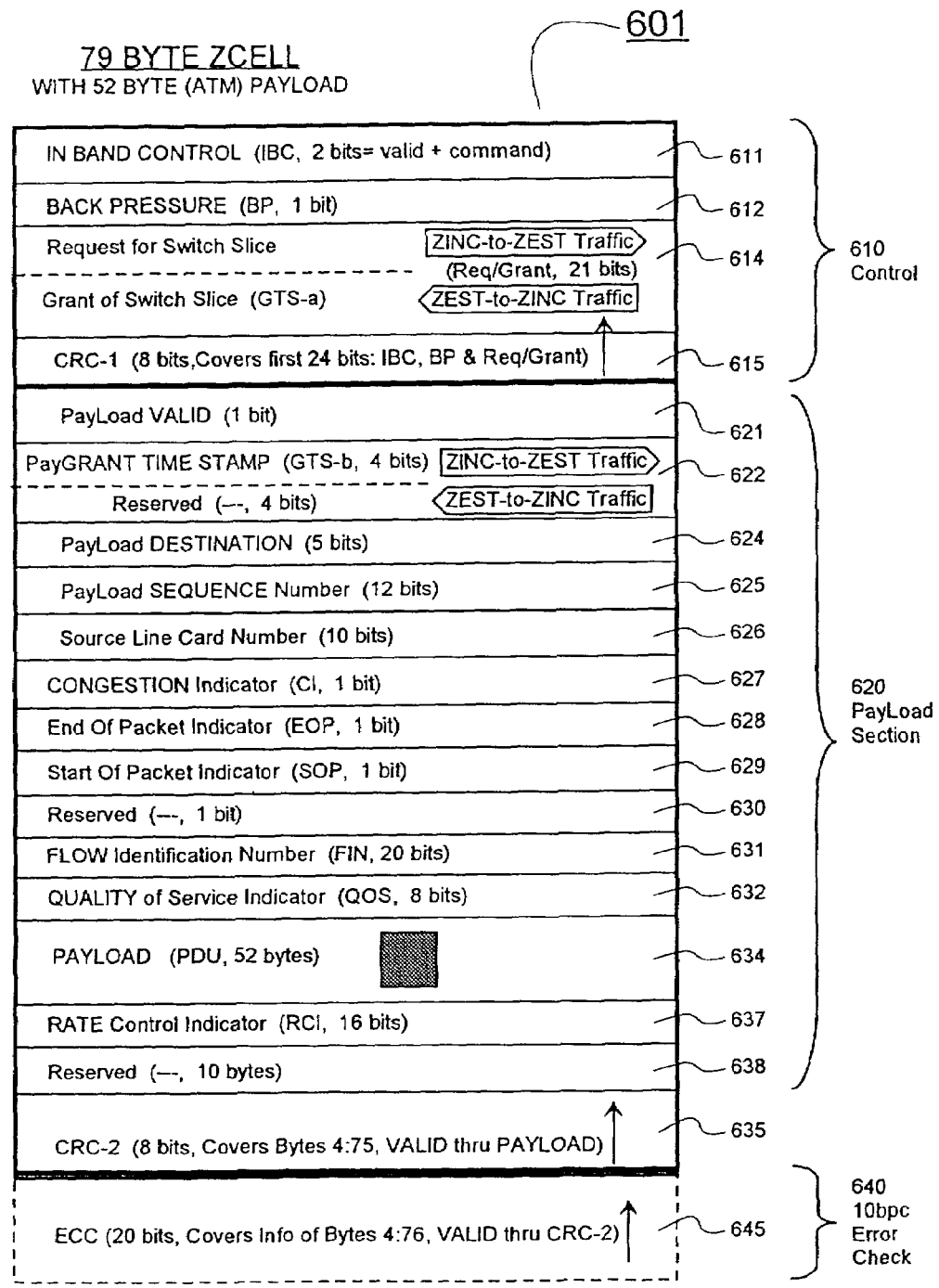
FIG. 6A shows a data structure of a second 79 word ZCell in accordance with the invention.

Referring to FIG. 6A, a data structure 601 of a second 79 word ZCell in accordance with the invention is shown. Most of this second 79 word ZCell 601 is similar to the structure 501 shown in FIG. 5A and the similar aspects therefore do not need to be re-described. Like elements are denoted by reference numbers in the '600' century series in place of those in the '500' century series. Field 634 is different however in that the payload-carrying region carries a payload of no more than 52 bytes (/bites) such as for the case of ATM traffic. This smaller payload-carrying region 634 is useful if the system is known to not be using cells or packets of the 64 bytes oriented variety or whole multiples thereof as may occur with high frequency in IP traffic. Some of the recovered bits in the 79 byte/(bite) structure 601 are used to define a 2 byte/(bite) Rate Control Indicator field 637. The RCI field 637 carries cell rate negotiation information that is useful in ATM and like systems for controlling traffic rates in situations where congestion may occur. The remaining 10 bytes (/bites) that are recovered from the shrinkage of the payload-carrying region define a reserved field 638 that is reserved for future expansion and is padded with zeroes or another fixed character string in the current version.

Figure 6B:
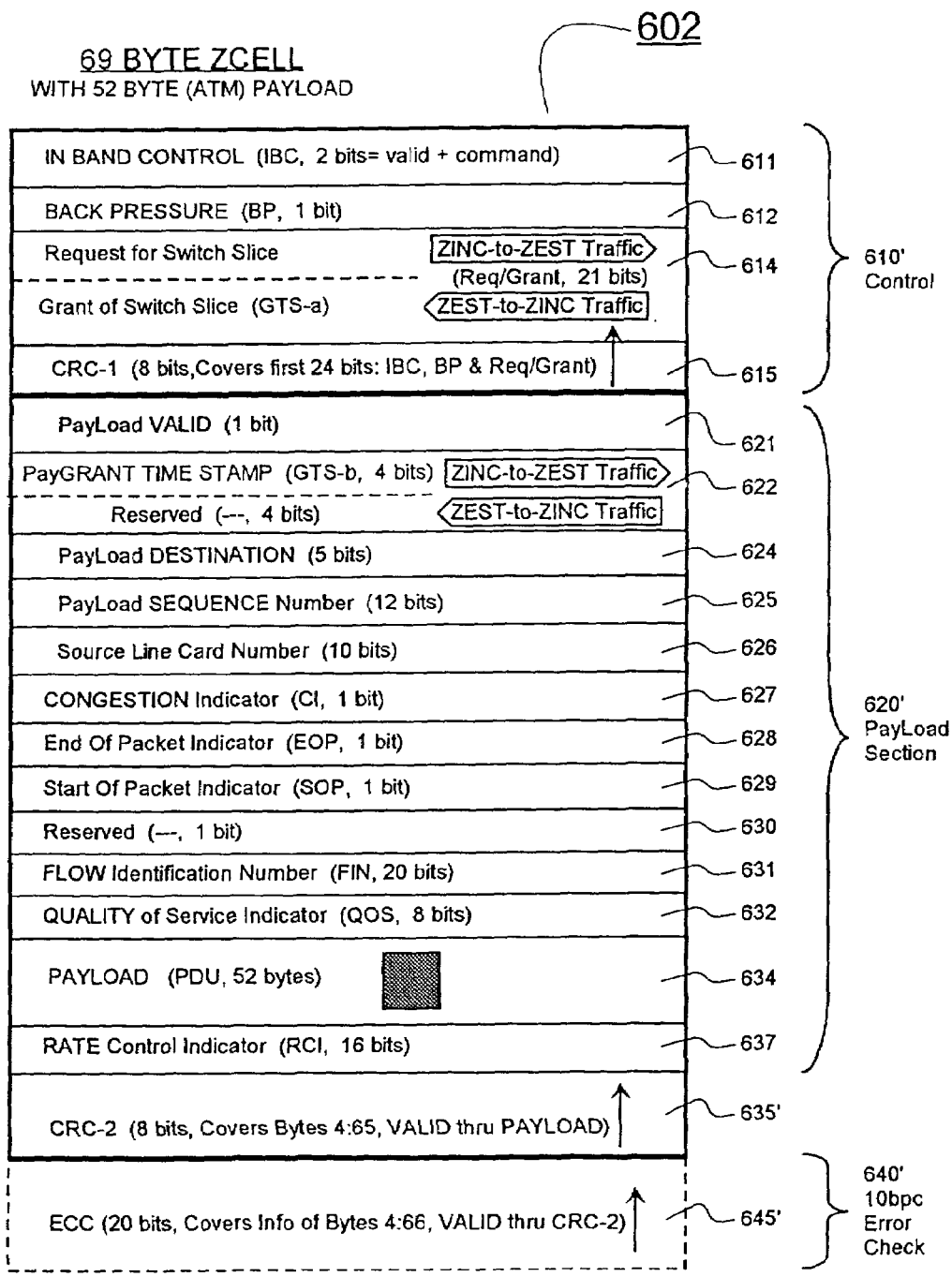
FIG. 6B shows a data structure of a 69 word ZCell in accordance with the invention.

Referring to FIG. 6B, a data structure 602 of a third ZCell 602 in accordance with the invention is shown. Most of this 69 word ZCell 602 is similar to the structure 601 shown in FIG. 6A and the similar aspects therefore do not need to be re-described. The primary difference is that reserved field 638 has been deleted and the overall size of the ZCell therefore shrinks to 69 bites when counting the ECC field 645'. Smaller ZCells each consume less of the limited bandwidth of the switch fabric layer (105) and thus allow higher throughput rates provided the payload-carrying regions 634 are efficiently filled in successive ZCells. It was found that with current integrated circuit technologies, the 79 bites per ZCell organization was near the technology tolerance limits for supporting OC-192 throughput rates. Of course, as newer and faster technologies emerge, and/or new telecom protocols are adopted, practitioners may find it appropriate to increase the size of the payload-carrying region 534/634 and/or to add additional control overhead fields to the ZCell structure if such does not significantly reduce the payload throughput rate of the overall system below what is commercially demanded.

FIG. 7 is a block diagram of a multi-layered switch fabric system 700 that may be practiced in accordance with the invention. In the illustrated embodiment, each ZEST chip, ZT11.1 (751) through ZT2m.N (76m.N) sports a relatively small switching matrix such as 32×32 rather than 64×64. Box 705a and the dashed boxes behind it represent a first, two dimensional array of 32-by-32 ZEST chips, ZT11.1 through ZT1N.m. Box 705b and the dashed boxes behind it represent a second, two dimensional array of 32-by-32 ZEST chips, ZT21.1 through ZT2m.N(where N=32 and m=32). The ZEST chips in the box 705b and its underlies may be conceptually thought of as being horizontally-stacked and orthogonal to the vertically stacked ZEST chips in the box 705a and its underlies. There are 1024 ingress wires (701–7mN) from a respective set of up to 1024 line cards and a like number of to-line card egress wires (701'–7mN'). Optional line-to-switch interface layer 703a/703a' may be employed to provide serialized interfacing between the line cards (not shown) and the two layers, 705a and 705b of switching chips. Optional switch-to-switch interface layer 703b may be employed to provide serialized interfacing between the two layers, 705a and 705b of switching chips. Given the orthogonal cross connections between the two layers, 705a and 705b of switching chips, any of the from-line ingress wires (701–7mN) should be able to request transmission of corresponding ZCells, through the switch fabric layers, 705a and 705b, to any of the to-line egress wires (701'–7mN'). Other hierarchical switching architectures may alternatively be used.

Although not explicitly shown in FIG. 7, it is understood that the ZEST chips, ZT11.1 through ZT1$N.m$. of first layer boxes 705$a$, etc. each include ZINC-like circuitry for queuing up, passing-through ZCells in the first layer 705$a$, etc. and for sending requests for continued, and optionally serialized, transmission to the ZEST chips, ZT21.1–ZT2$m.N$ of the second layer 705$b$ and for responding to grants received from the second layer 705$b$. The second layer ZEST chips, ZT21.1–ZT2$m.N$ do not need to (but can) include a snake-sort or like reordering means for received payloads since that function can be carried out in the ZINC chips of the line cards.

The above disclosure is to be taken as illustrative of the invention, not as limiting its scope or spirit. Numerous modifications and variations will become apparent to those skilled in the art after studying the above disclosure.

Given the above disclosure of general concepts and specific embodiments, the scope of protection sought is to be defined by the claims appended hereto.

The invention claimed is:

1. A switching method comprising:
   (a) in a switch card layer, loading flow contents into respective ones of Virtual Output Queues (VOQs), where each VOQ is associated with a respective unicast destination or a prespecified set of multicast destinations;
   (b) conducting bidding competitions between subsets of the VOQ contents to determine which of one or more smaller number of VOQ contents will be allowed to submit a passage request to a subset-associated part of a switching fabric layer; and
   (c) stuffing bid-winning ones of the passage requests as primary requests into respective ZCell signals for transmission to the subset-associated parts of the switching fabric layer.

2. The switching method of claim 1 and further comprising:
   (d) first converting the request-stuffed ZCell signals to a serialized optical transmission domain, adding ECC fields and inserting synchronization bites, where the are ten bits per bite; and
   (e) transmitting the first converted ZCell signals with ECC fields and synchronization bites by way of optical medium in an interface layer to the switching fabric layer.

3. The switching method of claim 2 and further comprising:
   (f) second converting the request-stuffed and otpically-transmitted ZCell signals to a less-serialized electronic processing domain;
   (g) in the switch fabric, conducting grant competitions between received requests associated with said VOQ contents to determine which of one or more of VOQ's will be allowed to submit a smaller number of respective payloads for passage through a grant-associated part of the switching fabric layer and at what allocated time slots; and
   (h) injecting grants and corresponding first Grant Time Stamps (GTSa) into respective ZCell signals for transmission back to the request-associated parts of the line card layer.

4. The switching method of claim 3 and further comprising:
   (i) third converting the grant-carrying ZCell signals to more-serialized optical transmission domain format, adding ECC fields and inserting sync bites and idle bites; and
   (j) transmitting the third converted ZCell signals with ECC fields and sync bites and idle bites by way of optical medium in the interface layer to the switch card layer.

5. The switching method of claim 4 and further comprising:
   (k) fourth converting the grant-carrying ZCell's to the less-serialized electronic processing domain; and
   (l) in the line card layer, inserting grant-winning payloads and associated second Grant Time Stamps (GTSb) into respective ZCell signals for transmission back to the grant-giving parts of the switching fabric layer.

6. The switching method of claim 5 and further comprising:
   (m) fifth converting the payload-carrying ZCell signals to the optical transmission domain, adding ECC fields and inserting sync bites; and
   (n) transmitting the fifth converted ZCell's with ECC fields and sync bites by way of optical medium in the interface layer to the switching fabric layer.

7. The switching method of claim 6 and further comprising:
   (o) sixth converting the payload-carrying ZCell signals to the electronic processing domain;
   (p.1) in the switch fabric layer, re-aligning the ZCell-carried payloads according to their respective, second Grant Time Stamps (GTSb); and
   (p.2) switching the re-aligned payloads through the switch fabric layer during time slots associated with their respective, second Grant Time Stamps (GTSb).

8. The switching method of claim 7 and further comprising:
   (q) seventh converting the switched payload-carrying ZCell signals to the optical transmission domain, adding ECC fields and inserting sync bites and idle bites; and
   (r) transmitting the seventh converted ZCell signals with ECC fields and sync bites and idle bites by way of optical medium in the interface layer to the line card layer.

9. The switching method of claim 8 and further comprising:
   (s) eighth converting the switched-payload-carrying ZCell signals to the electronic processing domain; and
   (t) in the line card layer, re-ordering received ones of the switched-payloads according to accompanying source and sequence designations.

10. The switching method of claim 9 and further comprising:
    (u) attaching destination-based flow identification numbers (FIN) to the re-ordered and switched-payloads; and
    (v) forwarding the FIN-bearing switched-payloads to their respective destination lines.

11. A switching method for use in a scalable communication system that forwards ingressing data signals to a multi-part switch fabric and obtains egressing data signals from the multiple parts of the multi-part switch fabric, with said ingressing data signals selectively routing to the switch fabric via an asynchronous interconnect layer, said method comprising:
    (a) for each of plural ones of the ingressing data signals that are to propagate via the asynchronous interconnect layer to a respective part of the multi-part switch fabric and then to a destination point, supplying a multi-bit first destination field that at least partially identifies the respective destination point, where the first multi-bit destination field is sufficiently large to identify at least 16 different destination points;

(b) before forwarding the ingressing data signals via the asynchronous interconnect layer to respective parts of the multipart switch fabric, conducting a first bidding competition between subsets of the ingressing data signals that are vying to pass through a same first part of the multipart switch fabric to respective destination points so as to determine which of one or more smaller number of the competing data signals that are vying to pass through the same first part of the switch fabric will be allowed to have a passage request submitted on their behalf to the respective first part of the multi-part switch fabric layer; and (c) stuffing bid-winning ones of the passage requests as primary requests into respective asynchronous transmission cells for transmission via the asynchronous interconnect layer to respective, first competition-associated parts of the switch fabric, where each primary request includes the corresponding first multi-bit destination field of the corresponding, ingressing data signal.

12. The switching method of claim 11 wherein:

(a.1) the first multi-bit destination field is sufficiently large to identify 64 different destination points.

13. The switching method of claim 11 and further comprising:

(b.1) before forwarding the ingressing data signals via the asynchronous interconnect layer to respective parts of the multipart switch fabric, conducting a second bidding competition between subsets of the ingressing data signals that are vying to pass through a same second part of the multipart switch fabric to respective destination points so as to determine which of one or more smaller number of the competing data signals that are vying to pass through the same second part of the switch fabric will be allowed to have a passage request submitted on their behalf to the respective second part of the multi-part switch fabric layer.

14. The switching method of claim 11 and further comprising:

(d) after said transmission of the transmission cells via the asynchronous interconnect layer, conducting respective third competitions in the respective parts of the multi-part switch fabric for determining which requests will receive corresponding grants.

15. The switching method of claim 14 wherein:

(d.1) said conducting of the respective third competitions includes using the corresponding first multi-bit destination fields to determine if the desired passage through a same first part of the multipart switch fabric to a respective destination point is not possible because a required egress path has already been allocated for passing another signal in a desired time slot.

16. The switching method of claim 15 wherein:

(d.2) said conducting of the respective third competitions further includes using a grant markup table for determining if a required egress path has already been allocated for passing another signal in a desired time slot.

17. A scalable communication system that forwards ingressing data signals to a multi-part switch fabric and obtains egressing data signals from the multiple parts of the multi-part switch fabric, with said ingressing data signals selectively routing to the switch fabric via an asynchronous interconnect layer, said system comprising:

(a) request formulating means for forming, for each of plural ones of the ingressing data signals that are to propagate via the asynchronous interconnect layer to a respective part of the multi-part switch fabric and then to a destination point, a multi-bit first destination field that at least partially identifies the respective destination point, where the formed first multi-bit destination field is sufficiently large to identify at least 16 different destination points;

(b) first bidding competition means for use before the forwarding of the ingressing data signals via the asynchronous interconnect layer to respective parts of the multipart switch fabric, the first bidding competition means conducting a first bidding competition between subsets of the ingressing data signals that are vying to pass through a same first part of the multipart switch fabric to respective destination points so as to determine which of one or more smaller number of the competing data signals that are vying to pass through the same first part of the switch fabric will be allowed to have a passage request submitted on their behalf to the respective first part of the multi-part switch fabric layer; and (c) request stuffing means for stuffing bid-winning ones of the passage requests as primary requests into respective asynchronous transmission cells for transmission via the asynchronous interconnect layer to respective, first competition-associated parts of the switch fabric, where each primary request includes the corresponding first multi-bit destination field of the corresponding, ingressing data signal.

18. The scalable communication system of claim 17 and further comprising:

(c.1) secondary request stuffing means for stuffing secondary bid-winning ones of the passage requests as secondary requests into respective asynchronous transmission cells for transmission via the asynchronous interconnect layer to respective, first competition-associated parts of the switch fabric, where each secondary request includes the corresponding second multi-bit destination field of the corresponding, ingressing data signal which designates an egress path different than that designated by the accompanying primary request within the transmission cell.

* * * * *